(12) United States Patent
Page et al.

(10) Patent No.: US 8,462,774 B2
(45) Date of Patent: Jun. 11, 2013

(54) VIRTUAL IP INTERFACES ON MULTI-CHASSIS LINK AGGREGATES

(75) Inventors: Gregory G. Page, Sandy, UT (US); Sahil P. Dighe, Salt Lake City, UT (US); Roberto H. Jacob Da Silva, Oak Park, CA (US); Bruce R. Jones, Salt Lake City, UT (US); Srinivas V. Tyamagondlu, Santa Clara, CA (US)

(73) Assignee: Alcatel Lucent, Paris (FR)

( * ) Notice: Subject to any disclaimer, the term of this patent is extended or adjusted under 35 U.S.C. 154(b) by 237 days.

(21) Appl. No.: 13/010,711

(22) Filed: Jan. 20, 2011

(65) Prior Publication Data

US 2012/0033672 A1   Feb. 9, 2012

Related U.S. Application Data

(60) Provisional application No. 61/370,622, filed on Aug. 4, 2010.

(51) Int. Cl.
*H04L 12/56* (2006.01)
*H04J 1/16* (2006.01)

(52) U.S. Cl.
USPC ........... 370/369; 370/375; 370/380; 370/419; 370/463

(58) Field of Classification Search
USPC .......................... 370/369, 375, 380, 419, 463
See application file for complete search history.

(56) References Cited

U.S. PATENT DOCUMENTS

| 7,161,948 | B2 | 1/2007 | Sampath et al. | |
| 7,173,934 | B2 | 2/2007 | Lapuh et al. | |
| 7,633,955 | B1 * | 12/2009 | Saraiya et al. | 370/401 |
| 2007/0019642 | A1 * | 1/2007 | Lu et al. | 370/389 |

* cited by examiner

*Primary Examiner* — John Pezzlo
(74) *Attorney, Agent, or Firm* — Garlick & Markison; Holly L. Rudnick

(57) ABSTRACT

Aggregation Switches connected via a virtual fabric link (VFL) are each active and each coupled to a multi-chassis link aggregate group (MC-LAG), which is assigned to a multi-chassis link aggregate group virtual local area network (MC-LAG VLAN). A virtual Internet Protocol (IP) interface is allocated to the MC-LAG VLAN and configured on both Aggregation Switches.

20 Claims, 13 Drawing Sheets

VIRTUAL IP INTERFACES ON MULTI-CHASSIS LINK AGGREGATES

CROSS-REFERENCE TO RELATED PATENTS

The present U.S. Utility patent application claims priority pursuant to 35 U.S.C. §119(e) to U.S. Provisional Application Ser. No. 61/370,622, entitled, "MULTI-CHASSIS VIRTUAL-FABRIC LINK AGGREGATION SYSTEM," filed Aug. 4, 2010, which is incorporated by reference herein and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to data networks and in particular to systems and methods for providing IP multicast snooping and routing.

2. Description of Related Art

Data networks allow many different computing devices, for example, personal computers, IP telephony devices or servers to communicate with each other and/or with various other network elements or remote servers attached to the network. For example, data networks may comprise, without limitation, Metro Ethernet or Enterprise Ethernet networks that support multiple applications including, for example, voice-over-IP (VoIP), data and video applications. Such networks regularly include many interconnected nodes, commonly known as switches or routers, for routing traffic through the network.

The various nodes are often distinguished based on their location within particular areas of the network, commonly characterizing two or three "tiers" or "layers," depending on the size of the network. Conventionally, a three tier network consists of an edge layer, an aggregation layer and a core layer (whereas a two tier network consists of only an edge layer and core layer). The edge layer of data networks includes edge (also called access) networks that typically provide connectivity from an Enterprise network or home network, such as a local area network, to a metro or core network. The edge/access layer is the entry point of the network, i.e., to which the customer network is nominally attached, and the switches residing at the edge layer are known as edge nodes. Different types of edge networks include digital subscriber line, hybrid fiber coax (HFC) and fiber to the home. Edge nodes may perform, for example, L2 switching functions for the attached devices. The edge nodes are generally connected to an aggregate layer that terminates access links coming from multiple edge nodes. Switches residing at the aggregation layer are known as Aggregation Switches. Aggregation Switches may perform, for example, L2 switching and L3 routing of traffic received via the aggregate links from the edge nodes. The aggregate layer is connected to a metro or core network layer that performs Layer 3/IP routing of traffic received from the Aggregation Switches (in a three tier network) or from edge nodes (in a two tier network). As will be appreciated, nodes at each incremental layer of the network typically have larger capacity and faster throughput.

One of the key challenges faced by data networks is the need for network resiliency, i.e., the ability to maintain high availability despite eventual component failures, link failures or the like, which is critical to providing satisfactory network performance. Network resiliency may be achieved in part through topological redundancy, i.e., by providing redundant nodes (and redundant components within nodes) and multiple physical paths between nodes to prevent single points of failure, and in part through L2/L3 protocols to exploit the redundancy upon occurrences of failures to converge upon alternate paths for switching/routing traffic flows through the network. As will be appreciated, detection and convergence times must occur quickly (advantageously, less than one second) to achieve seamless transition to the alternate paths.

Ethernet protocol is a transport technology that is used ubiquitously in local area networks (LAN), such as the home and enterprise networks to communicate between computers and networks. However, the use of Ethernet protocol technology in access and aggregate networks, as well as metro networks, is continuing to rise and to revolutionize the edge network as it did the enterprise network. As an access technology, Ethernet offers significant advantages over other access technologies, such as: (i) future-proof transport for data, video and voice applications; (ii) cost-effective infrastructure for data services; and (iii) simple, globally accepted standard that will ensure interoperability.

In order to adapt Ethernet technology to a carrier-grade service environment in edge and aggregate layer networks, a number of issues remain to be addressed, including resiliency to failures. In one known solution, the spanning tree protocol (STP) is commonly used to detect failures and divert traffic to alternate paths when failures occur in Ethernet networks. Generally, STP relies on multiple physical paths between switches, but with only one path active at any one time, the other path being placed in a blocking mode (defining an "active/passive" paradigm). When failures occur, an alternative path is brought out of the blocking mode into an active state, thereby re-establishing the connection.

However, STP can result in unacceptable convergence times (e.g., up to several seconds) in some network topologies, including without limitation, convergence between edge nodes and Aggregation switches of a data network. Further, STP provides only for an active/passive operation paradigm whereby not all links are actively forwarding traffic at the same time.

In an active-active environment, as described in co-pending U.S. patent application Ser. No. 13/010,168, filed on even date herewith, in which all paths are simultaneously active on redundant Aggregation switches, the convergence time can be greatly reduced. However, in order to allow multiple Aggregation switches to cooperate in such a multi-chassis system, the Aggregation switches may need to provide Layer 3 services. To fully distribute Layer 3 information though between the Aggregation Switches adds unnecessary complexity and produces a scalability issue.

Accordingly, there is a need for systems and methods to provide Layer 3 services on a multi-chassis system without the need to implement full synchronization of resources, such as routing information, ARP tables and IP forwarding databases.

DETAILED DESCRIPTION OF THE INVENTION

Figure 1:
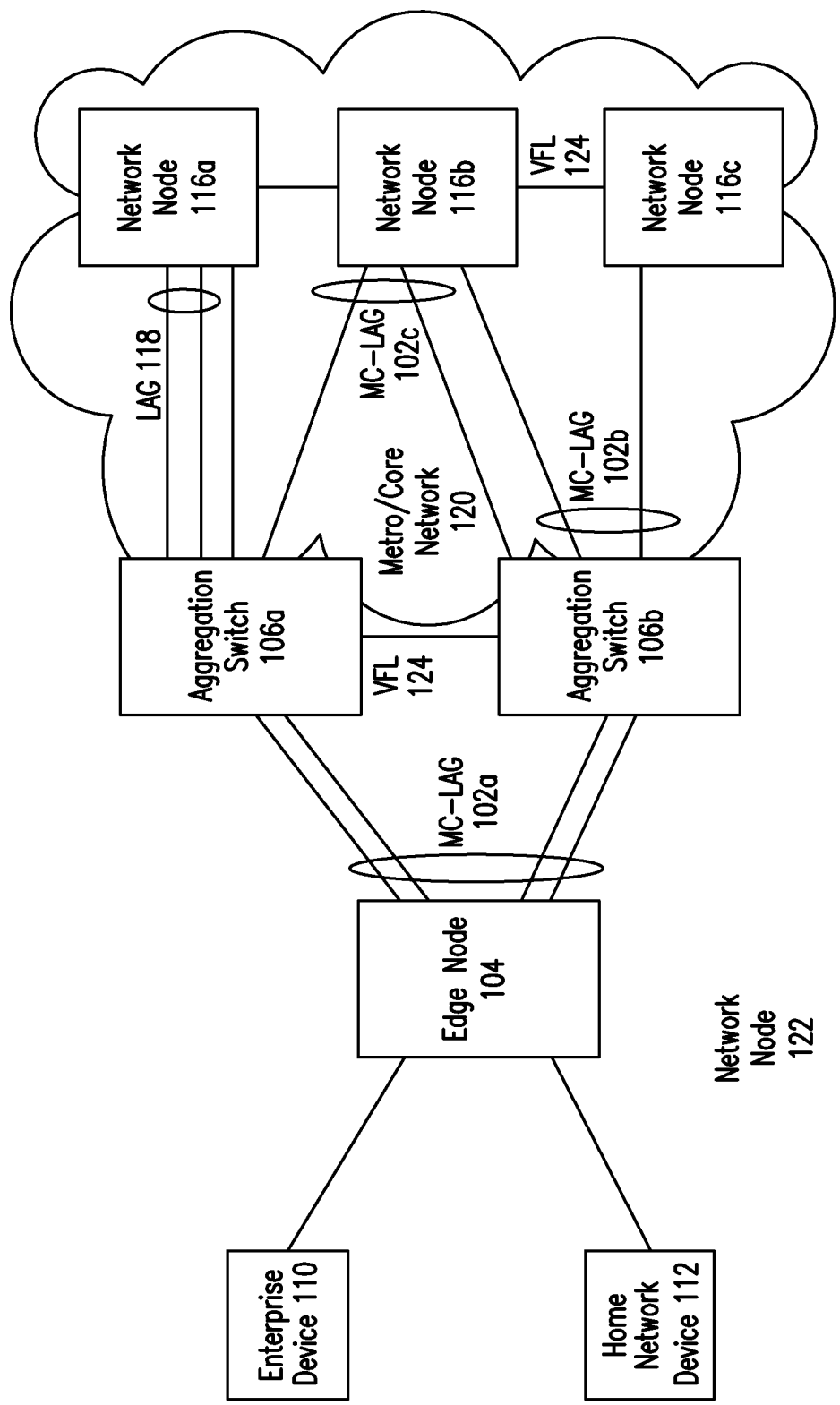
FIG. 1 illustrates a schematic block diagram of an embodiment of a network architecture in accordance with the present invention.

FIG. 1 illustrates an embodiment of a resilient network 100 with multi-chassis link aggregation that provides an active/active paradigm (i.e., all links actively forwarding traffic at the same time) that more fully utilizes the capacity of the network nodes. The following abbreviations are herewith defined:

| | |
|---|---|
| CMM | Chassis Management Module |
| IGMP | Internet Group Management Protocol |
| IP | Internet Protocol |
| IPMS | Internet Protocol Multicast |
| LAG | Link Aggregation |
| L2 | Layer 2 ("Data Link Layer") of the OSI model for networks |
| L3 | Layer 3 ("Network Layer") of the OSI model for networks |
| MAC | Media Access Control Protocol |
| MC-LAG | Multi-Chassis Link Aggregate Group |
| MC-VFA | Multi-Chassis Virtual Fabric Aggregation |
| NIM | Network Interface Module |
| STP | Spanning Tree Protocol |
| VLAN | Virtual Local Area Network |
| VRRP | Virtual Router Redundancy Protocol |
| ASIC | Application Specific Integrated Circuit |

The following standards are referred to in this application and are incorporated by reference herein: 1) the Link Aggregation Control Protocol (LACP) which was formerly clause 43 of the IEEE 802.3 standard added in March 2000 by the IEEE 802.3ad task force and is currently as incorporated in IEEE 802.1AX-2008 on Nov. 3, 2008; and 2) IEEE Std. 802.1Q, Virtual Bridged Local Area Networks, 2003 edition.

The LACP provides a method to control the bundling of several physical links, called a link aggregation group (LAG), between two peer nodes to form a single logical channel there between. The peer nodes negotiate the bundling of the physical links into a LAG by exchanging LACP packets, or alternatively the LAG can be configured manually. Link aggregation offers an inexpensive way to transfer more data than any one single port or link can deliver alone. In an embodiment, the ports of a LAG include the same physical type, such as all copper ports (CAT-5E/CAT-6), all multi-mode fiber ports (SX), or all single-mode fiber ports (LX). In another embodiment, the ports of a LAG may have a different physical type.

To provide increased resiliency and remove a single point of failure, a LAG is split across two devices as seen in FIG. 1 and is referred to herein as a multi-chassis link aggregation group (MC-LAG) 102. For example, in FIG. 1, MC-LAG 102a originates from edge node 104 and is split into two subsets and connected to two Aggregation Switches 106a and 106b, with one or more physical links of the MC-LAG 102a in each subset. In an embodiment, the edge node 104 may use load balancing techniques to distribute traffic across all available links of the MC-LAG 102a. For each packet transmitted over the MC-LAG 102a, one of the physical links is selected based on a load-balancing algorithm (usually involving a hash function operating on the source and destination Internet Protocol (IP) or Media Access Control (MAC) address information). Load balancing across the physical links of the MC-LAG 102 results in a more effective use of bandwidth.

As seen in FIG. 1, the edge node 104 is connected over an access network 122 to an enterprise network device 110, such as a bridge, switch, router, etc., that is operating in a LAN, and/or it may also be connected to a home network device 112, such as a DSL modem, set-top box, optical line terminal, etc. The edge node 104 is a switch or server and may functionally include a digital subscriber line access multiplexer (DSLAM), cable modem termination system (CMTS), optical line terminal (OLT), etc. in an embodiment but may include other types of devices as well.

In an embodiment, the Aggregation Switches 106 are coupled with a virtual fabric link (VFL) 124. The VFL 124 provides a connection for exchange of information between the Aggregation Switches regarding traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP) and the status of the MC-LAG 102a. The Aggregation Switches 106 operate transparently to the edge node 104 and are treated as a single logical device by the edge node 104. The edge node 104 is able to actively forward traffic on the MC-LAG 102a while the synchronization of MAC address tables and other forwarding information between the Aggregation Switches 106 is driven by L2 packet flows over the VFL along with a reduced amount of control messaging in an embodiment. This feature enables dual homing of the edge node 104 to the pair of Aggregation Switches 106 and provides a Layer 2 multi-path intra-structure as well as basic Layer 3 access infra-structure. In addition, in an embodiment, the MC-VFA feature provides this functionality without requiring Layer 2 redundancy protocols (e.g. Spanning Tree) between the edge node 104 and Aggregation Switches 106, while still facilitating a carrier-grade detection and convergence time to edge uplink failures as well as aggregation/core switch failures. Many recent network designs, especially for data centers, are requiring an ever increasing number of layer 2 adjacencies between edge node and Aggregation Switches. This trend is pushing the limits of the spanning tree protocol, such as loop-detection function and convergence times. The spanning tree convergence time can be of up to several seconds in many current network topologies. The multi-chassis architecture in an embodiment provides a dual-homed, layer 2 multi-path connection between the edge node 104 and Aggregation Switches 106 preferably without needing to run the spanning tree protocol operation for loop prevention, while still being flexible enough to allow the spanning tree protocol operation along with the multi-chassis functionality in some of the portions of the network topology in an embodiment (e.g. between the Aggregation Switches over the virtual fabric link as well as over the links connecting these devices to upstream/core switches).

The feature in some embodiments also facilitates fast failover detection and convergence times for access uplink failures, virtual fabric link failures and node failures. Another advantage of the MC-VFA architecture in an embodiment is the active/active forwarding mode of the edge node 104 whereby both sets of operational MC-LAG uplinks are processing traffic to increase efficiency of the use of bandwidth of the MC-LAG links.

As seen in FIG. 1, in an embodiment, the Aggregation Switches 106 are also connected to a metro or core network 120 that includes one or more network nodes 116, such as network switches and/or routers, using the MC-LAG functionality (as part of the MC-VFA architecture) as described herein. For example, Aggregation Switch 106b is connected to network nodes 116b and 116c over MC-LAG 102b wherein the network nodes 116b and 116c exchange state information over a VFL as well. The MC-LAG 102b architecture provides a dual-homed, layer 2 multi-path connection between the aggregation switch 106b and network nodes 116b and 116c. In an embodiment, network nodes 116 can also be connected using MC-LAG functionality, as seen with MC-LAG 102c and VFL 124. The Aggregation Switches 106 may also be connected to the network nodes 116 using a standard LAG, such as LAG 118, or other trunks or links.

Figure 2:
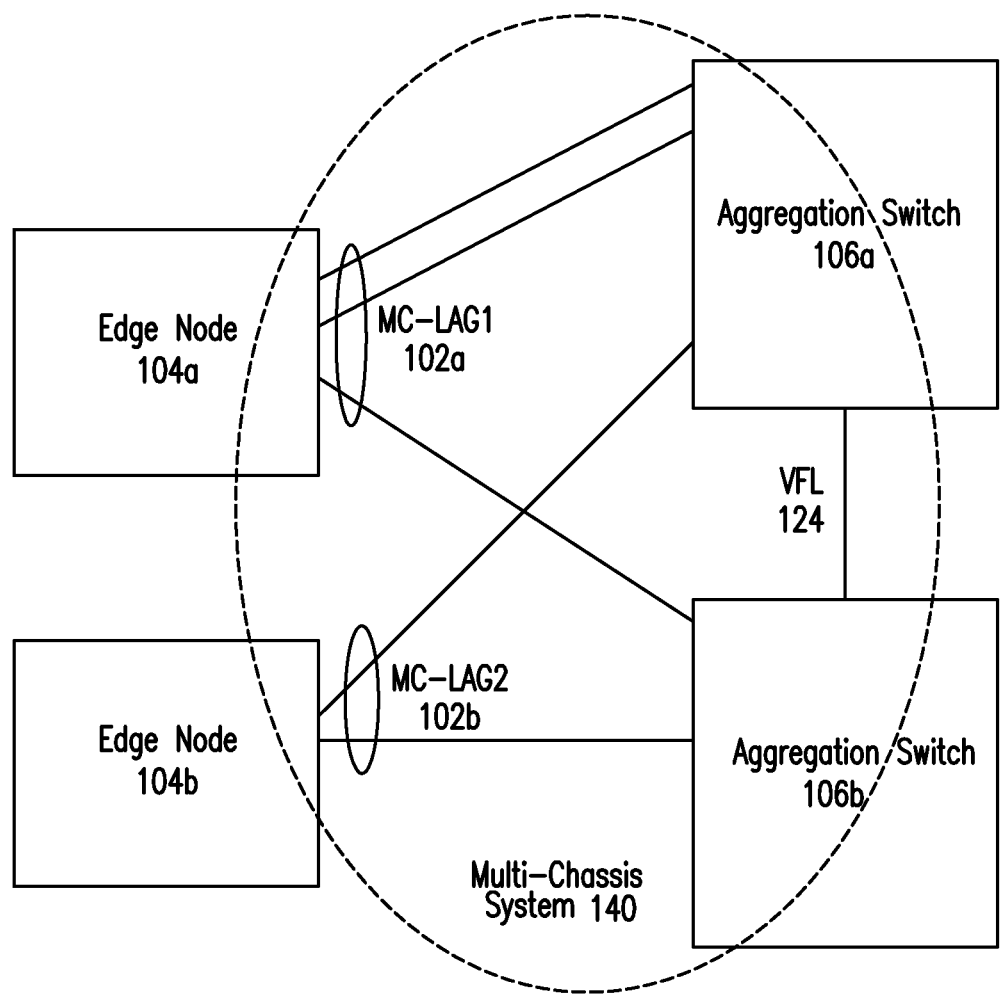
FIG. 2 illustrates a schematic block diagram of an embodiment of a multi-chassis system in accordance with the present invention.

The MC-VFA architecture is now described in more detail with respect to FIG. 2. Edge node 104a is connected to Aggregation Switches 106a and 106b by a first MC-LAG1 102a while edge node 104b is connected to Aggregation Switches 104a and 104b by second MC-LAG2 102b. Each MC-LAG 102a and 102b includes a plurality of physical links divided into at least two subsets, wherein each of the two subsets includes at least one physical link. As seen in FIG. 2, the first set of MC-LAG 102a physical links are terminated at a first Aggregation Switch 106a while the second set of MC-LAG 102a physical links are terminated at a second Aggregation Switch 106b. MC-LAG1 forms logical dual homed, layer 2 multi-paths. The MC-LAG member ports are the external, user ports that are members of the MC-LAG 102. The VFL 124 is an aggregate of ports that in an embodiment span multiple network interface modules for resiliency and provides for inter-chassis traffic and control/state data transfer. The multi-chassis system 140 includes the Aggregation Switches 106, the virtual fabric link 124, the MC-LAG 102a, the MC-LAG 102b and their respective MC-LAG member ports attached to the downstream edge devices. The Aggregation Switches 106a and 106b are separate physical switches with each operable as a stand-alone switch and each encased by its own separate physical chassis. The Aggregation Switches 106a and 106b may be in the same geographic area, such as in a central office or data center, or may be separate geographic locations, such as different buildings or cities, to provide geo diversity.

The edge nodes 104 operating as MC-LAG clients attached to the Aggregation Switches can use different methods to assign traffic to the links within their aggregates as long as the choice of links remains fixed for a given flow. This ensures that traffic is delivered in-sequence between any pair of communicating end stations. In an embodiment, the same number of uplink ports from the edge devices to each one of the MC-LAG Aggregation Switches should preferably be configured. In other words, if two uplinks are configured between the edge switch and one of the MC-LAG Aggregation Switches, then two uplinks between the edge switch and the other multi-chassis switch should also be configured. Although not mandatory, this arrangement provides a more homogeneous traffic distribution for flows between the multi-chassis switches and the edge device.

Figure 3:
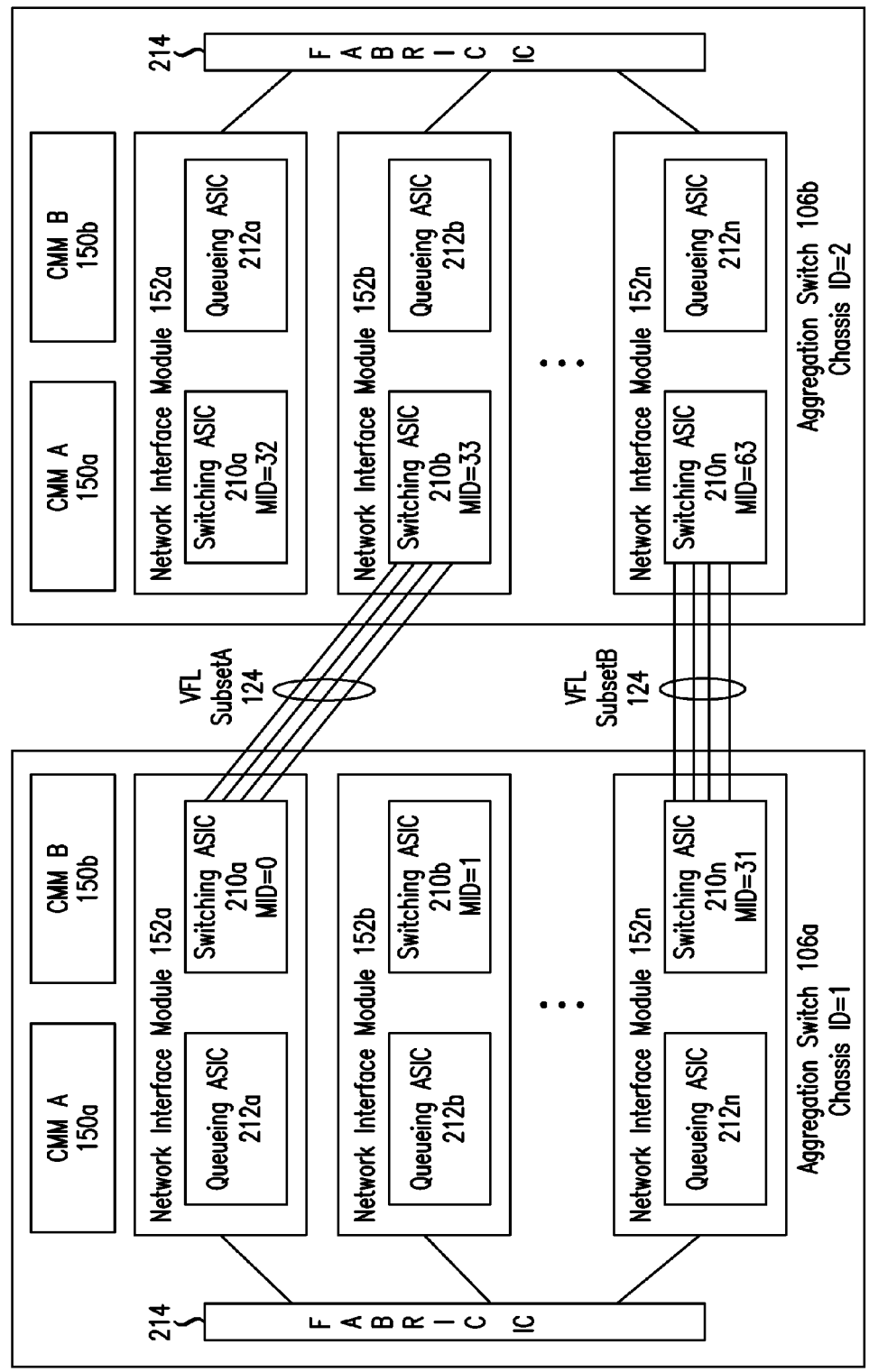
FIG. 3 illustrates a schematic block diagram of an embodiments of Aggregation Switches in a multi-chassis system in accordance with the present invention.

The Virtual fabric link (VFL) 124 between the Aggregation Switches 106 is now described in more detail with respect to FIG. 3. The Aggregation Switches 106 in one embodiment each include at least one CMM module 150a (primary) and preferably a second CMM module 150b (back-up) as well as a plurality of Network Interface modules (NIM) 152, such as line cards or port modules. The VFL 124 is an aggregate of VFL member ports connected to one or more NIMs 152, in the first and second Aggregation Switches 106. For example, VFL 124 includes a first subset A of physical links between NIM 152a of Aggregation Switch 106a and NIM 152b of Aggregation Switch 106b, and a second subset B of physical links between NIMs 152n of Aggregation Switch 106a and 106b. In an embodiment, the VFL links are connected between Switching ASICs 210 residing in the NIMs 152 of the Aggregation Switches 106. The NIMs 152 each also include a Queuing ASIC 212, described further below. A switching fabric inter-connect (IC) 214 provides an interconnection between the various NIMs 152 in the Aggregation Switch 106.

A unique chassis identifier is assigned to each Aggregation Switch 106 in the multi-chassis system. The Chassis ID for each Aggregation Switch 106 is unique and global, e.g. each Aggregation Switch is aware of the chassis ID of its peer Aggregation Switch. Unique hardware device identifiers (MIDs) for various components, such as IC, NIM, CMM, in each Aggregation Switch are also generated allowing for management of local and remote objects. In an embodiment, the hardware device identifiers for the Switching ASICs 210 have global significance within the multi-chassis system while MIDs for other components, such as Queuing ASICs 212, may have only local significance. For example, the hardware device identifiers' assigned to the Switching ASICs 210 are known by both Aggregation Switches 106 while hardware device identifiers for other devices are restricted to a local Aggregation Switch and have no significance to the remote Aggregation Switch.

In an embodiment, the Switching ASICs 210 are assigned a global unique hardware device identifier (MID) in a range assigned to its Aggregation Switch, such as:

Aggregation Switch 106a: Chassis ID=1 and MID values 0-31

Aggregation Switch 106b: Chassis ID=2 and MID values 32-63

Exemplary MIDs assigned to Switching ASICs 210 are shown in FIG. 3. By knowing the assigned range, a module is able to determine the location of a switching ASIC from its MID as in Aggregation Switch 106*a* or Aggregation Switch 106*b*. In an embodiment, the Switching ASICs 210 operate in a pre-pended header mode to exchange data and control packets between the Aggregation Switches 106.

Figure 4:
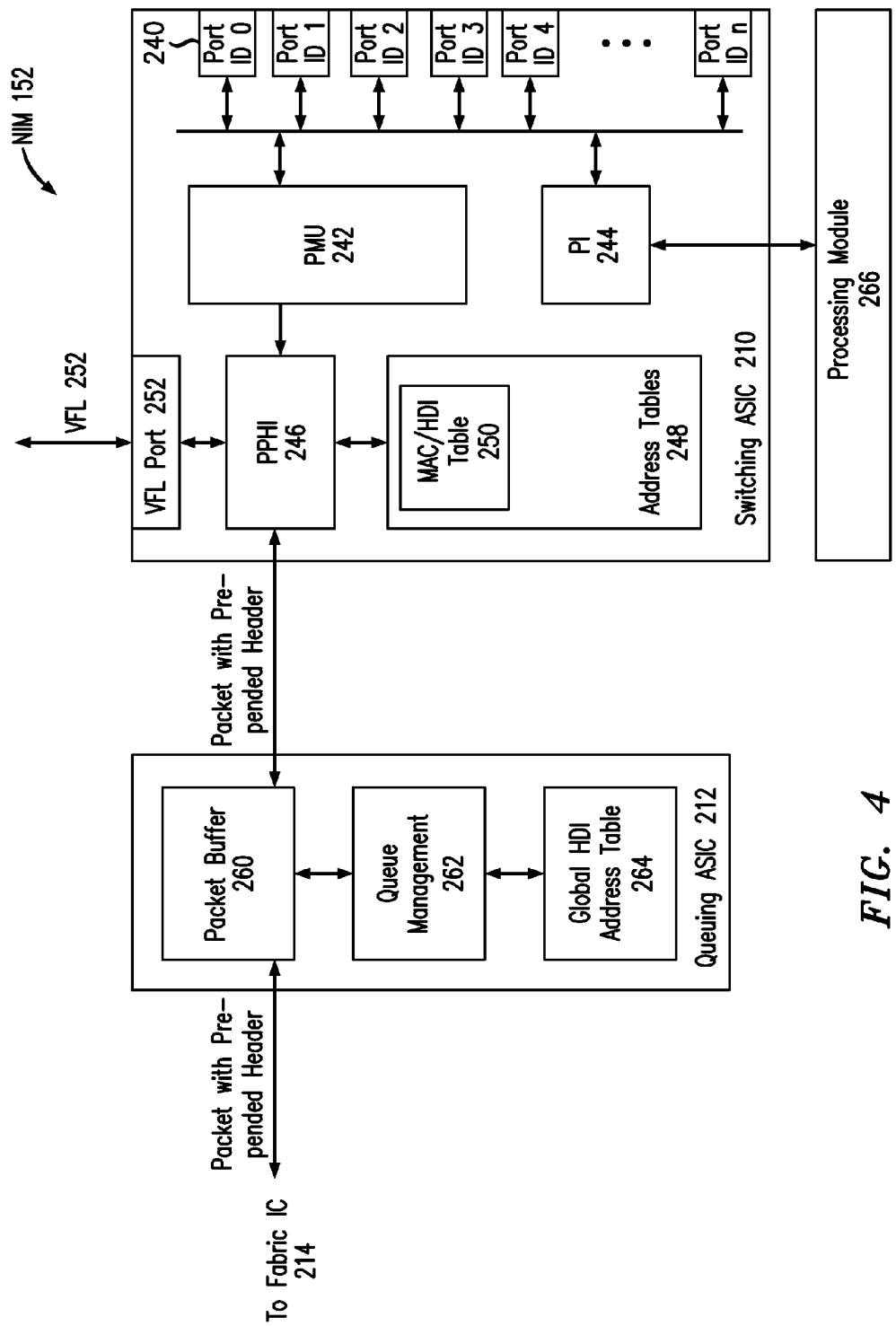
FIG. 4 illustrates a schematic block diagram of an embodiment of a network interface module of an Aggregation Switch in a multi-chassis system in accordance with the present invention.

FIG. 4 illustrates a schematic block diagram of an embodiment of a network interface module (NIM) 152 in more detail. The Switching ASIC 210 includes a plurality of external port interfaces 240 that are connected to external nodes, such as edge nodes 104*a* and 104*b*. One or more of the external port interfaces 240 may include member ports for a MC-LAG physical link, LAG or other trunk group, fixed link, etc. The external ports 240 may have the same physical interface type, such as copper ports (CAT-5E/CAT-6), multi-mode fiber ports (SX) or single-mode fiber ports (LX). In another embodiment, the external ports 240 may have one or more different physical interface types.

The external ports 240 are assigned external port interface identifiers (Port ID), e.g., device port values, such as gport and dport values, associated with the Switching ASICs 210. In an embodiment, MIDs of the Switching ASICs 210 and external port interface identifiers for external ports 240 on the Switching ASICs 210 are used to uniquely identify a physical external port interface 240 of a Switching ASIC 210 on either the local or remote Aggregation Switch in the multi-chassis system. In another embodiment, a Port Manger that includes a conversion module or other entity may convert the MIDs of the Switching ASICs 210 and external port identifiers into a single integer value, to generate a global port value (GPV), e.g. MID 4; device port identifier (dport) 5 converts to GPV 20. In either example, unique external port identifiers for the external ports of NIMs 152 in both the local and remote Aggregation Switches are generated. Unique port identifiers may also be assigned to internal ports of a Switching ASIC 210, such as an internal port from the Switching ASIC 210 to a processing module on the NIM 152. These internal ports are also uniquely identified by the port identifier and the MID of the Switching ASIC.

The Switching ASIC 210 further includes a packet management unit (PMU) 242 that determines a destination address of incoming packets. The packets may be switched to another external port interface 240 of the Switching ASIC 210, to the Queuing ASIC 212 for transmission to another NIM 152 on the local or remote Aggregation Switch, or to the processor interface (PI) 244 for transmission to a processing module 266 of the NIM 152 external or internal to the Switching ASIC 210.

When a packet is to be transmitted to another NIM 152 on the local or remote Aggregation Switch, in an embodiment, the Switching ASIC 210 transfers the packet to a pre-pended packet header interface (PPHI) that adds or otherwise modifies the packet header to include hardware device information (HDI). The HDI includes identifiers of hardware devices associated with the source and/or the destination of the packet. In an embodiment, the pre-pended header may include other information such as packet priority and load balance identifiers. To obtain destination HDI information, the PPHI performs a look-up process to MAC/HDI forwarding table 250. The MAC/HDI forwarding table 250 stored in the address table memory 248 includes a list of MAC address entries, such as MAC address for external devices, nodes, modules, software or hardware connected to the Aggregation Switch 106. The MAC address entries include associated hardware device information used in bridging or routing a packet to reach a device with the associated MAC address. The destination hardware device information includes, for example, the port identifier and MID of a Switching ASIC 210 (e.g. MID=24, port ID=5 or MID=54, device port=12), of either the local or peer Aggregation Switch, associated with the destination MAC address. In another embodiment, the destination hardware device information may include the global port value (GPV) of the external port interface associated with the destination MAC address. The MAC/HDI forwarding table 250 may include one or more tables, such as source trunk map, trunk bitmap table, trunk group tables, VLAN mapping table, etc. In an embodiment, the MAC/HDI forwarding table 250 or parts thereof may be located in the Queuing ASIC of the NIM 152 as well.

In an embodiment, when the Switching ASIC 210 includes an active VFL member port 252 with a link to the remote Aggregation Switch, the MAC/HDI forwarding table 250 may include additional HDI information, such as a table to associate gport values into Switching ASIC MID values and device port values and/or a table with logical aggregate group identifiers mapping to external port interfaces.

In an embodiment, the pre-pended header includes hardware device information HDI associated with the source port, such as an external or internal port interface, including hardware device identifier MID of the Switching ASIC and device port identifier of the source port.

In another embodiment, the pre-pended header includes HDI associated with a Switching ASIC 210 connected to the VFL port 124 (such as MID=0 or MID=31 for Aggregation Switch 106*a* in FIG. 3). The Switching ASIC 210 connected to the VFL port will then translate or convert the HDI in the pre-pended header before transmitting the packet over the VFL.

In an embodiment, the PPHI 246 also appends source hardware device information associated with the source port, e.g. the external port interface 240 that first received the packet. The source hardware device information may include the MID of the Switching ASIC 210 and the port identifier (e.g., device port) and/or global port value (GPV) of the external port interface 240. Additional information, such as destination hardware device identifier or MID, a destination device port, VLAN ID, packet type (multicast, unicast, broadcast), packet priority and load balance identifier is also added to the pre-pended header in an embodiment. In an embodiment, the destination HDI is retrieved from the address tables 248, such as MAC/HDI forwarding table 250.

The packet with the pre-pended header is then transmitted to the Queuing ASIC 212 for routing over the Fabric IC 214. The Queuing ASIC 212 includes a packet buffer 260, a queue management 262 for providing traffic and buffer management and a global HDI address table 264. The global HDI address table 264 maps the destination HDI to the appropriate queues in Queuing ASICs 212 in one or more of the other NIMs 152. For example, the mapping provides information for switching the packet into an appropriate egress queue for one or more of the external port interfaces in other Queuing/Switching ASICs in the Aggregation Switch 106 based on the hardware device information in the pre-pended header. In another example, when the destination HDI indicates a destination on the remote Aggregation Switch (i.e. the destination device identifier belongs to a remote/peer switch range), the Queuing ASIC 212 switches the packet to an appropriate egress queue for one or more of the VFL port interfaces in the local Aggregation Switch 106 for transmission to the remote Aggregation Switch over the VFL 124, e.g. the global HDI address table 264 indicates that the associated hardware device is located on the remote Aggregation Switch. In this scenario, the determination of the egress queue corresponding to a particular VFL port interface is made based on the load balance identifier present in the pre-pended header and inserted previously by the switching ASIC 210.

Though the switching ASIC 210 and Queuing ASIC 212 are illustrated as separate integrated circuits or modules, one or more functions or components of the ASICs may be included on the other ASIC or combined into an alternate ASIC or otherwise be implemented in one or more integrated circuits.

Figure 5:
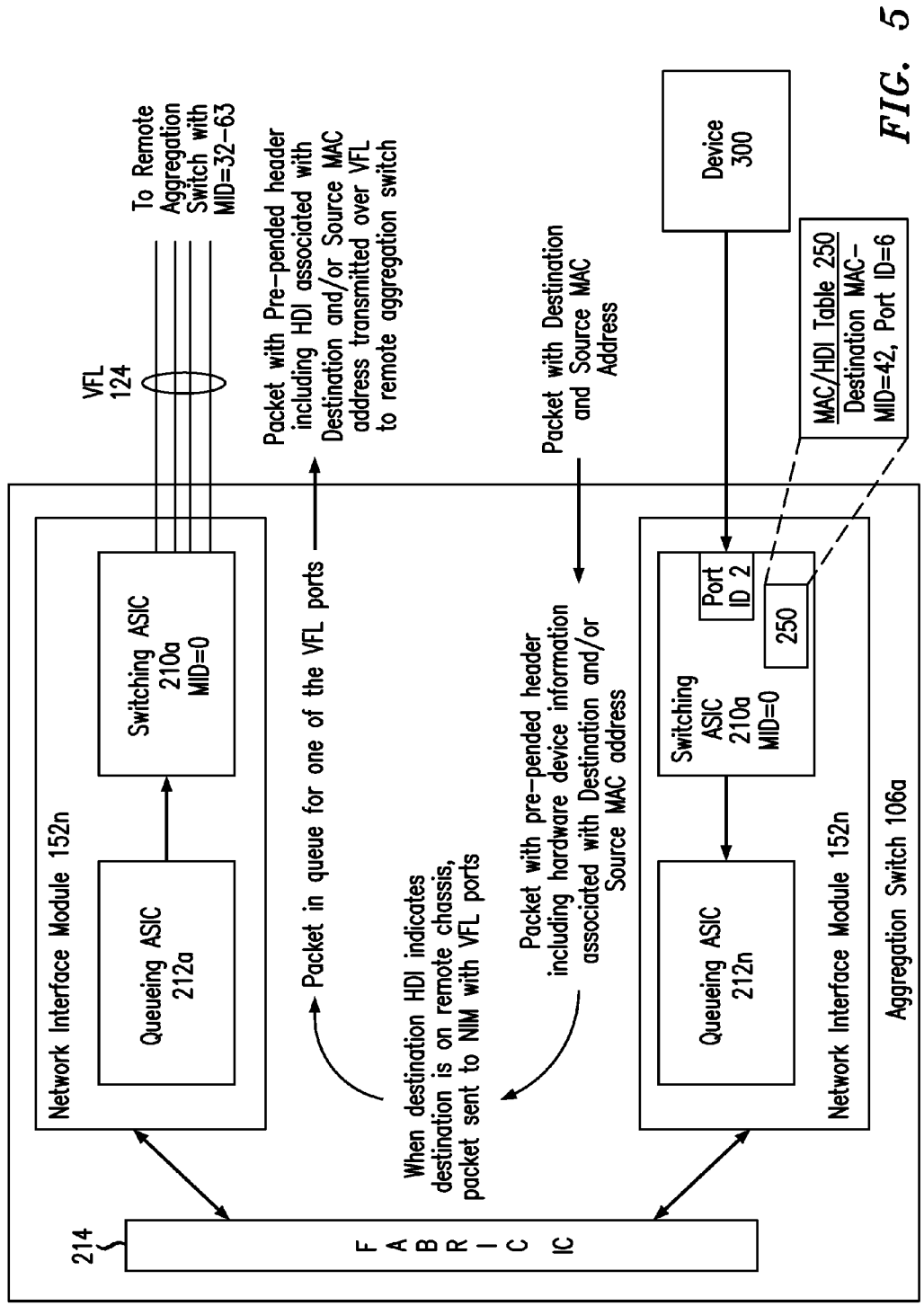
FIG. 5 illustrates a schematic block diagram of an embodiment of packet flow through an Aggregation Switch in a multi-chassis system in accordance with the present invention.

FIG. 5 illustrates a schematic block diagram of an embodiment of a packet flow through Aggregation Switch 106*a* to VFL 124. In this example, a device 300 with source MAC address, such as enterprise device 110 or home network device 112, transmits a packet, e.g. through edge node 104, to Aggregation Switch 106*a* with a destination MAC address of a device that may be accessed over an external port interface of the remote Aggregation Switch 106*b*. Switching ASIC 210*n*, e.g. with MID=31 in FIG. 5, in NIM 152*n* receives the packet on an external port interface 240, e.g. with port ID=2. The Switching ASIC 210*n* extracts a destination MAC address and performs an address table look-up to determine hardware device information (HDI) associated with the destination MAC address from MAC/HDI forwarding table 250. The destination HDI may include, e.g., device module identifiers (MIDs) of one or more hardware components in a path to the destination device with the MAC address, such as NIMs 152, Queuing ASICs 212, Switching ASICS 210, external port identifiers 240, member ports of the VFL 124, of either the local Aggregation Switch 106*a* or remote Aggregation Switch 106*b*. In an embodiment, the destination HDI may include the MID of the Switching ASIC 210 and port identifier (e.g., device port) of the external port interface 240 that provides access to the destination device. Furthermore, in an embodiment, the pre-pended header includes a packet priority and a load balance identifier determined based on parameters retrieved from the original packet (source MAC address, destination MAC address, source IP address, destination IP address). In another example, the HDI would include a global port value (GPV) for the external port interface 240 or MID of the NIM 152 that provides access to the destination device. In another embodiment, when the destination MAC address is associated with the remote Aggregation Switch, the HDI may include the hardware device identifier MID for the NIM 152*a* or Switching ASIC 210 (such as MID=0) connected to the VFL 124. The destination HDI is added to a pre-pended header that adds information to the original packet header (such as a layer 2, Ethernet packet header type). The Switching ASIC 210*n* also includes source hardware device information (HDI) for one or more devices associated with the originating external port interface, e.g. port ID=2. The source HDI may include one or more hardware device identifiers, such as MID of the originating Switching ASIC 210, source port identifier (e.g. device port), global port value, MID for source NIM 152, Chassis ID, etc.

The packet with pre-pended header is transmitted to the Queuing ASIC 212*n* which then determines a NIM 152 on the local Aggregation Switch to transmit the packet based on the destination HDI. When the destination HDI indicates a local external port interface on the Aggregation Switch 106*a* (e.g. based on the destination MID contained in the pre-pended header), the Queuing ASIC 212*n* places the packet in an egress queue for transmission to the corresponding NIM 152 of the local external port interface. In another example illustrated in FIG. 5, the Queuing ASIC 212*n* determines that the destination HDI indicates a destination hardware device on the remote Aggregation Switch, e.g. the HDI indicates Switching ASIC with MID=45 on the remote Aggregation Switch. To reach the remote Aggregation Switch, the packet needs to be transmitted over the VFL 124. So, the Queuing ASIC 212*n* transmits the packet with pre-pended header from a queue over the Fabric IC 214 to NIM 152*a* connected to the VFL 124. The selection of a VFL member port is made based on the load balance identifier parameters carried on the pre-pended header. The Queuing ASIC 212*a* on NIM 152*a* receives the packet with pre-pended header and queues the packet for transmission over the VFL 124. The Switching ASIC 210*a* then transmits the packet with pre-pended header including the source and/or destination HDI to the remote Aggregation Switch over the VFL 124.

In an embodiment, the Switching ASIC 210*a* may alter the pre-pended header prior to transmission over the VFL 124. For example, the Switching ASIC 210*a* may translate a destination HDI with local significance (e.g., a gport value or local hardware device identifier MID) to an HDI with global significance. The Switching ASIC 210*a* then transmits the packet with pre-pended header including the source and/or destination HDI to the remote Aggregation Switch over the VFL 124.

In an embodiment, when multiple Switching ASICs 210 of an Aggregation Switch 106 are connected to the VFL 124, e.g. in FIG. 3, Switching ASICs MID=0 and MID=31, the traffic to be transmitted over the VFL 124 may be distributed. For example, a load balance identifier map table in the Global HDI Address Table 264 of the Queueing ASIC 212 would indicate the following distribution:

| Destination MID | Outgoing Port | MID's Device Location |
| --- | --- | --- |
| [0-31] | VFL 124 | Local |
| [32-63] | VFL 124 | Remote |

The Queueing ASICs 212 map the packets to the appropriate VFL port interface using the load balance identifiers or other load balancing techniques. For example, in an embodiment with 8 NIMs 152 on each Aggregation Switch, each Queuing ASIC 212*n* has a set of 8 queues configured to each NIM (Module ID, Port) within the local Aggregation Switch. In an embodiment, the Queuing ASICs 212 connected to the Switching ASICs 210 with the VFL 124 have a separate set of 8 queues related to each VFL member port interface. Each of those queues is assigned to the FIFOs associated with the internal VFL ports connecting the multi-chassis switches. In an embodiment, with multiple Virtual Fabric Link member ports, the queues are assigned such that the destination ports on the remote chassis are equally distributed among the Queuing ASICs 212*a* and 212*n* that host the Virtual Fabric Link Member Ports.

In an embodiment, the MAC/HDI forwarding tables in the NIMs 152 are populated and then updated in response to layer 2 packets flowing through the system. Since the pre-pended header includes source MAC address and source HDI information, the NIMS 152, e.g. in specific the Switching ASICs 210 in an embodiment, are able to populate the MAC/HDI forwarding table 250 with this information. By operating in a pre-pended header mode to exchange Layer 2 packets with source MAC addresses and source HDI over the VFL 124, the Switching ASICs 210 are able to synchronize MAC address tables between the Aggregation Switches 106. Though the MAC/HDI forwarding table is described in the Switching ASICs 210, the MAC/HDI forwarding table may be included, alternatively or in addition to, in the Queuing ASICs 212*n* or other module of the NIM 152. In another embodiment, the CMM 150 (primary and secondary) may also include a MAC/

HDI forwarding table for one or more types of links between the Aggregation Switches 106.

Figure 6:
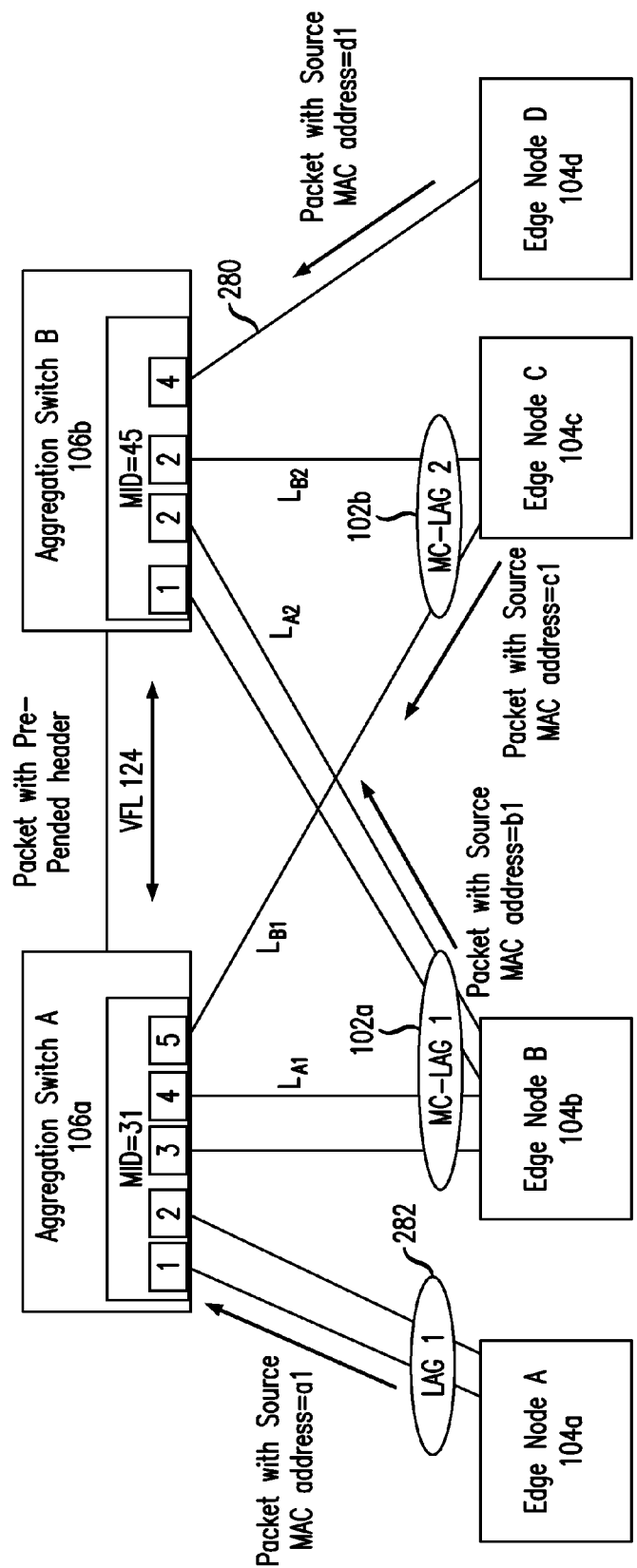
FIG. 6 illustrates a schematic block diagram of an embodiment of source address learning in a multi-chassis system in accordance with the present invention.

FIG. 6 illustrates a schematic block diagram of an embodiment of a multi-chassis system that illustrates source MAC learning. Edge nodes 104 are connected to Aggregation Switches 106a and 106b over logical aggregate group LAG1 282, multi-chassis logical aggregate group MC-LAG1 102a, multi-chassis logical aggregate group MC-LAG2 102b and fixed port link 280. In an embodiment, each Aggregation Switch communicates to the other Aggregation Switch configuration information for logical aggregate groups, such as LAG1 and other types of trunk groups, and hardware device information associated thereto. In an embodiment, the hardware device information includes physical ports associated with the logical aggregate groups, e.g. hardware device or module identifiers (MID) of Switching ASICS and external port identifiers for links associated with the logical aggregate groups (device port values or gport values).

For example, in an embodiment, Aggregation Switch A notifies Aggregation Switch B that the logical aggregate group with aggregate group identifier LAG1 is associated with a Switching ASIC having a hardware device module identifier MID=31 and external port interface with identifier device port=1, 2. Aggregation Switch B notifies Aggregation Switch A that the logical aggregate group with aggregate group identifier MC-LAG1 is associated with a Switching ASIC having hardware device module identifier MID=45 and external port interface identifier device port=1, 2. Other hardware device information, such as identifiers of NIMs, Queuing ASICs, etc. associated with the logical aggregate groups may be exchanged alternatively or in addition to the Switching ASIC's MIDs and device port values. The Aggregation Switches 106 also provide notifications of updates to the configuration information of the logical aggregate groups for both ordinary aggregates and multi-chassis aggregate groups. The hardware device information associated with the logical aggregate groups and multi-chassis aggregates of either of the Aggregation Switches is included in one or more of the MAC/HDI forwarding tables in NIMs 152 on both Aggregation Switches. For example, in an embodiment, one or more of the MAC/HDI forwarding tables in both Aggregation Switches 106 includes the following information:

| Type of Aggregate Group | Aggregate Group Identifier | HDI List of VFL Member Ports |
| --- | --- | --- |
| LAG | LAG1 | (MID = 31, Port ID = 1) |
|  |  | (MID = 31, Port ID = 2) |
| MC-LAG | MC-LAG1 | (MID = 31, Port ID = 3) |
|  |  | (MID = 31, Port ID = 4) |
|  |  | (MID = 45, Port ID = 1) |
|  |  | (MID = 45, Port ID = 2) |
| MC-LAG | MC-LAG2 | (MID = 31, Port ID = 5) |
|  |  | (MID = 45, Port ID = 3) |

Since the same aggregate group identifiers for logical aggregate groups (e.g. LAG1) are known and utilized by both Aggregation Switches 106, in an embodiment, the multi-chassis system assigns a subset of aggregate group identifiers to each type of logical group and for each of the Aggregation Switches 106. For example, in an embodiment with a maximum of 128 possible aggregate groups, an assignment of aggregate group identifiers would include:

| Type of Aggregate Group | Aggregation Switch | Range Configuration | Range Default | Range Example |
| --- | --- | --- | --- | --- |
| LAG | chassis 1 | MIN_LAG_ID_LOCAL MAX_LAG_ID_LOCAL | [0-47] | [0-100] |
| LAG | chassis 2 | MIN_LAG_ID_REMOTE MAX_LAG_ID_REMOTE | [48-95] | [101-120] |
| MC-LAG | Both chassis | MIN_MC-LAG_ID MAX_MC-LAG_ID | [96-127] | [121-127] |

The Aggregation Switches 106 assign aggregate group identifiers based on the assigned ranges and type of aggregate group. As such, packet forwarding in the Aggregation Switches is performed by accessing the MAC/HDI forwarding tables and using the mapping between the logical aggregate groups and hardware device information. Typically, aggregate identifier information is not transferred in the prepended headers.

In an embodiment, to facilitate load balancing over a LAG or MC-LAG, when an Aggregation Switch 106 receives a packet over the VFL 124 with destination HDI information, such as (MID, Port ID), the Aggregation Switch 106 determines whether the destination HDI is included in a logical aggregate group by searching for the port identified in the source HDI (destination MID, destination Port identifier) in one or more of its internal trunk tables that contain a list of all ports that are active members of each LAG or MC-LAG aggregate group. When a destination port is found in an associated LAG or MC-LAG, the Aggregation Switch 106 may perform load balancing techniques by assigning the packet to one or more different external port interfaces of the associated LAG. For example, when Switching ASIC 210 connected to the VFL in the remote Aggregation Switch 106b receives a packet with destination HDI of MID=45, port 2, the switching ASIC 210 determines from its MAC/HDI table below, that MID=45, port 2 is part of MC-LAG1 as shown in the example in FIG. 6. The switching ASIC may then decide to perform load balancing and determine through one or more hash algorithms to transmit the packet over MID=45, port 1 of MC-LAG1 instead. In this particular example, the switching ASIC will then strip off the pre-pended header prior to transmitting the packet out of the external port (MID=45, port 1).

| Aggregation Switch A ||
| --- | --- |
| LAG ID | HDI |
| LAG1 | (MID = 31, Port ID = 1) |
|  | (MID = 31, Port ID = 2) |
| MC-LAG1 | (MID = 31, Port ID = 3) |
|  | (MID = 31, Port ID = 4) |
|  | (MID = 45, Port ID = 1) |
|  | (MID = 45, Port ID = 2) |
| MC-LAG-2 | (MID = 31, Port ID = 5) |
|  | (MID = 45, Port ID = 3) |

Referring back to FIG. 6, various embodiments of methods and implementations therefore are now described for learning source MAC addresses and associated hardware device information (HDI) in a multi-chassis system. First, in an embodiment, for unknown unicast packets ingressing on a configured fixed port of one of the Aggregation Switches (e.g. traffic originating on fixed port 280 with source MAC address=d1), the Source MAC address is populated in MAC/HDI forwarding tables on both Aggregation Switches 106a and 106b as associated with hardware device information (HDI) of the originating configured fixed port (such as MID of Switching ASIC and source port identifier value or gport value of the source port, NIM identifier, or other hardware device ID associated with the source port). As such, in an embodiment, the source MAC address d1 is stored in one or more MAC/HDI forwarding tables of both Aggregation Switch A and Aggregation Switch B with the VLAN ID and HDI associated with the source port, e.g., MID=45, Port ID=4.

Next, in an embodiment, unknown unicast traffic ingressing on a logical aggregate group connected to only one of the Aggregation Switches 106, such as a trunk group or other type of LAG (e.g. traffic originating on LAG1 with source MAC address=a1), the Source MAC address is populated in MAC/HDI forwarding tables on both Aggregation Switches 106a and 106b as associated with the originating logical aggregate group identifier (e.g., LAG1). As such, in an embodiment, the source MAC address a1 received on LAG1 by Aggregation Switch A is stored in one or more MAC/HDI forwarding tables of both the Aggregation Switches 106 with the VLAN ID and logical aggregate group identifier LAG1. In addition, as explained herein, the MAC/HDI forwarding tables of both Aggregation Switches store the hardware device information associated with logical aggregate groups (learned through distribution of configuration information by the CMM 150 module or other control plane process). The MAC/HDI forwarding tables thus include information that MAC address a1 is associated with trunk group identifier LAG1 and HDI information associated with LAG1.

Further, in an embodiment, for unknown unicast traffic ingressing on a MC-LAG member port (e.g. traffic originating on MC-LAG1 or MC-LAG2) of either Aggregation Switch 106, the Source MAC is populated in MAC/HDI forwarding tables as associated with the MC-LAG identifier and HDI information of the local member ports of the MC-LAG. The HDI information of the member ports of the MC-LAG will be the same for the MAC/LAG tables on each Aggregation Switch 106. In other words, both Aggregation Switches are fully aware of the entire list of member ports that are active participants of an MC-LAG aggregate group regardless of whether a member port is local or remote.

By associating member ports of a MC-LAG with a source MAC address, traffic destined to the MAC address through one of the edge nodes 104 is forwarded preferably via the MC-LAG member ports through the shortest path. This path reduces the amount of traffic crossing the VFL 124. In addition, it reduces MAC movement problems in some specific scenarios wherein traffic to and from an edge node 104 takes different paths over the MC-LAG for distinct flows. In the example of FIG. 6 in an embodiment, one or more of the MAC/HDI forwarding tables on the Aggregation Switches 106 includes the following information.

| MAC | LAG | LAG ID |
|---|---|---|
| Aggregation Switch A | | |
| a1 | Yes | LAG1 |
| b1 | Yes | MC-LAG1 |
| c1 | Yes | MC-LAG-2 |
| d1 | No | — |
| Aggregation Switch B | | |
| a1 | Yes | LAG1 |
| b1 | Yes | MC-LAG1 |
| c1 | Yes | MC-LAG-2 |
| d1 | No | — |

In another embodiment, MAC address tables displayed in a node or network management application may not include the HDI for the logical aggregation groups. The user displayed MAC address table may only include HDI for fixed ports and thus are similar for both Aggregation Switches 106.

| MAC | LAG | LAG ID | HDI |
|---|---|---|---|
| Aggregation Switch A | | | |
| a1 | Yes | LAG1 | N/A |
| b1 | Yes | MC-LAG1 | N/A |
| c1 | Yes | MC-LAG-2 | N/A |
| d1 | No | — | (MID = 45, Port ID = 4) |
| Aggregation Switch B | | | |
| a1 | Yes | LAG1 | N/A |
| b1 | Yes | MC-LAG1 | N/A |
| c1 | Yes | MC-LAG-2 | N/A |
| d1 | No | — | (MID = 45, Port ID = 4) |

The MAC/HDI forwarding tables are synchronized with respect to the LAG identifiers associated with the source MAC addresses. In addition, VLAN IDs associated with the MAC addresses may also be configured and synchronized on both Aggregation Switches. As such, logically, the Aggregation Switches 106 operate as a single bridge for MAC learning. Furthermore, MAC learning occurs automatically as traffic flows over the VFL 124 with minimum Layer 2/control module management software intervention and without the need for inter-process communication message-based MAC table synchronization.

Figure 7:
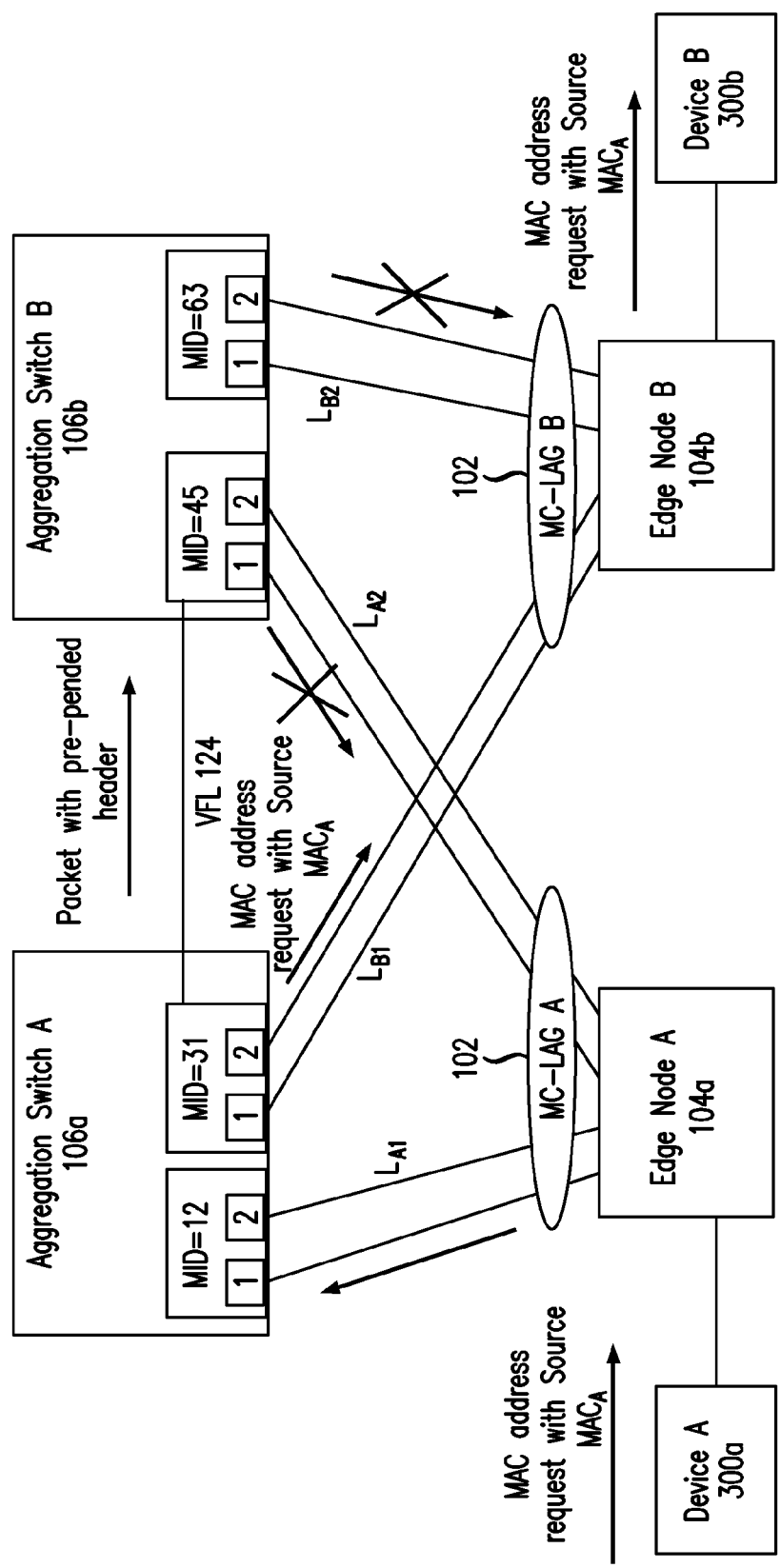
FIG. 7 illustrates a schematic block diagram of another embodiment of source address learning in a multi-chassis system in accordance with the present invention.

FIG. 7 illustrates an embodiment of a method for source MAC learning in a multi-chassis system in more detail. To determine a MAC address for device B, device A 300a (with MAC address=$MAC_A$) transmits a MAC address request, e.g. an address resolution packet (ARP) used in Ethernet protocols, with the target IP address for device B 300b. For example, the MAC address request may include:

Source MAC=$MAC_A$
Destination MAC=ff:ff:ff:ff:ff:ff (unknown)
Target IP=$IP_B$
VLAN ID=ID
Packet Type=Broadcast.

When received by the edge node 104a, it forwards the MAC address request over MC-LAG A to the "logical" Aggregation Switch 106 (composed of two physical switches 106a and 106b). Depending on the load balancing or hashing algorithm, the edge node 104a may transmit the MAC address request over either of the subsets of physical links of MC-LAG A, either $L_{A1}$ or $L_{A2}$. For this example, assume that the MAC address request is transmitted over $L_{A1}$ connected to Aggregation Switch 106a. In general, in an Ethernet switch, a MAC address request (such as ARP) is copied and broadcast over every port associated with the VLAN ID. In an embodiment, when Aggregation Switch 106a receives the MAC address request, it first appends a pre-pended header to the MAC address request with source logical aggregate group identifier (e.g., MC-LAG A) and/or source HDI (e.g., MID=12, port ID=1). The Aggregation Switch (e.g., in specific switching ASIC MID=12) then broadcasts copies of the packet with pre-pended header to each Switching ASICs with external port interfaces associated with the VLAN ID, such as Switching ASIC MID=31 in this example. The Switching ASICs on the Aggregation Switch 106a (e.g. MID=12, MID=31) receiving the MAC address request with pre-pended header then learn the source MAC address and the associated aggregate group identifier (either explicitly present in the pre-pended header or by searching for the source HDI information in its trunk tables, which contain the complete list of MC-LAG A's member ports as described herein, e.g., MID=12, Port IDs=1,2 and MID=45, Port IDs=1, 2) and are able to populate their MAC/HDI forwarding table with the aggregate group identifier information. For example, Switching ASIC MID=31 enters into its MAC/HDI forwarding table that source MAC address $MAC_A$ is associated with logical aggregate group MC-LAG A and/or with HDI of source port MID=12, port ID=1 depending on the specific embodiment. Prior to transmitting the MAC address request from external port interfaces to edge node B, Aggregation Switch 106a (e.g. Switching ASIC with MID=31) removes the pre-pended header thus retains an Ethernet or IP protocol header.

The Aggregation Switch 106a also transmits the broadcast packet with pre-pended header over the VFL 124 to Aggregation Switch 106b. The Aggregation Switch 106b also learns the source MAC address and associated aggregate group identifier and/or source HDI from the broadcast packet with pre-pended header. As described above, MAC addresses originating on MC-LAG local member ports in one Aggregation Switch and transmitted over the VFL are associated in the peer Aggregation Switch with the same MC-LAG because both switches are fully aware of the entire list of MC-LAG member ports. As such, when Aggregation Switch 106b receives the packet with pre-pended header, it stores the MC-LAG A's aggregate group identifier as associated with the source MAC address $MAC_A$. For example, Switching ASIC with MID=45 (and/or Switching ASIC with MID=63) enters into its MAC/HDI forwarding table that source MAC address $MAC_A$ is associated with logical aggregate group MC-LAG A.

Though a MAC address request is generally broadcast over every port associated with the VLAN ID, in an embodiment, a loop prevention mechanism prevents broadcast of packets received by an Aggregation Switch 106 over the Virtual Fabric Link 124 over local MC-LAG member ports. Thus, when Aggregation Switch 106b receives the MAC address request over VFL 124, it will not broadcast copies of the MAC address request over local MC-LAG A member ports $L_{A2}$ and local MC-LAG B member ports $L_{B2}$. This loop prevention mechanism prevents broadcast packet flows originating from Aggregation Switch A from looping to edge Node A and edge Node B through Aggregation Switch B. The loop prevention process thus provides for operation of the multi-chassis system without need of the spanning tree protocol on the MC-LAG member ports.

The Aggregation Switches 106a and 106b do not generate a response to the MAC address request because the destination IP address does not correspond to any of its local IP interfaces configured on its local VLANs. However, when edge node B receives the MAC address request (over $L_{B1}$), it will broadcast the packet to Device B which will then respond. As the response packet, which is a unicast packet, traverses the multi-chassis system to Device A, the source MAC address of Device B is learnt by the Aggregation Switches 106 in a similar process. Device A and Device B now are able to communicate with IP addressing over the Layer 2 multi-path infrastructure provided by the multi-chassis link aggregates. MAC addresses are learned as either associated with a particular port (for the case of fixed ports) or as associated with an aggregate group identifier (for the case of LAGs or MC-LAGs). Since the Aggregation Switches 106 have non-overlapping ranges of hardware device identifiers, MIDs, the hardware device identifiers are unique within the multi-chassis system 140. Using the global unique hardware device identifiers MIDs and external port identifiers, the MAC addresses can be associated with a fixed ports or aggregate group identifier.

Figure 8:
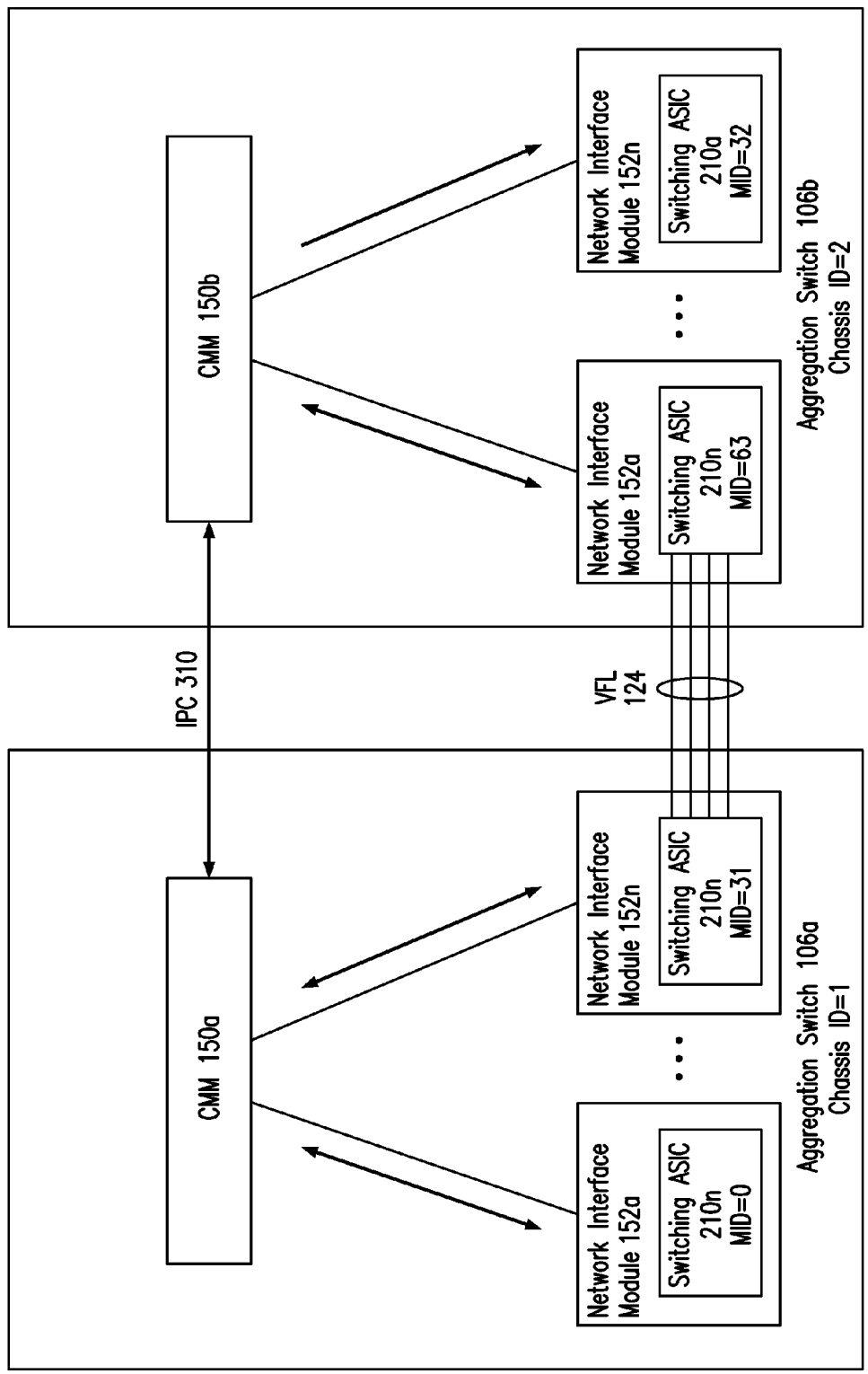
FIG. 8 illustrates a schematic block diagram of another embodiment of Aggregation Switches in a multi-chassis system in accordance with the present invention.

FIG. 8 illustrates a schematic block diagram of an embodiment for maintaining the MAC/HDI forwarding tables in the multi-chassis system. The MAC forwarding tables have a default or configured "aging" time for entries. When a MAC address in the MAC/HDI forwarding table has not been updated during the aging time, the entry will be deleted or flushed from the table. In the multi-chassis system however, the aging of entries may create a problem with continuous flooding when packet flows have different paths for the upstream and downstream directions. In order to maintain the MAC forwarding tables synchronized, a multi-chassis system needs to implement a keep-alive mechanism across the entire set of switches that are part of the system. Keep-alive packets are periodic packets (sent at a constant interval equal to the aging timeout parameter). These packets carry a reserved multicast destination MAC address to allow the packets to be flooded to all Switching ASIC devices 210 within all NIMs 152 in the multi-chassis system. The source MAC address of the packets is equal to the MAC address of each entry learned within the MAC forwarding table. As a result of this mechanism, a given MAC address will not age and be deleted or flushed unless it is no longer used in any of the Aggregation Switches within the multi-chassis system.

To avoid eternal MAC addresses (e.g., an address that will not age so as to be flushed or deleted), a MAC entry is assigned an "owner" or responsible module within the multi-chassis system. The owner of a MAC entry is generally a particular NIM 152. The MAC ownership is determined in different ways. For example, the MAC ownership may depend on the type of port on which it was first learned as follows. For MAC addresses associated with fixed ports, the Switching ASIC device 210 that contains the external port where the MAC address traffic was received is the owner of the MAC entry and controls the aging of the MAC address. Other Switching ASICs 210 learn this MAC address upon reception of a packet with a pre-pended header. The NIMs 152 that host such Switching ASIC devices 210 will not become owners of the MAC entry. A device becomes the owner of a MAC entry related to a fixed port only when it learned that address on from an external port interface.

For MAC addresses learned on aggregate ports (i.e. LAG or MC-LAG), the owner of a MAC address is determined by a similar mechanism as described for the fixed ports. The difference here is that the Switching ASICs 210 typically provide an additional feature called remote or local bit. This bit is only set when an entry is created and it never changes its value during the lifetime of a MAC entry. The local bit is set (i.e. local=1 or remote=0) only when: a) The entry does not already exist; b) A packet is received on a front panel port, e.g. there is no pre-pended header present. As a result of this approach, there will always be a single Switching ASIC device 210 in the system whose local bit is set. That NIM 152 hosting that Switching ASIC device 210 becomes the owner of this MAC address and hence responsible for the generation of keep-alive packets.

The NIMs 152 coordinate deleting an entry from the MAC/HDI forwarding tables. As shown in FIG. 8, a logical inter-process communication connection (IPC) 310 is created between the CMMs 150a and 150b of the Aggregation Switches 106. The same logical connections exist between any pair of NIMs 152. The IPC 310 may be created over the VFL 124 or over a LAN connection. When one of the NIMs 152 of a local Aggregation Switch 106a receives a flush message for a MAC address, it may decide to transmit the flush message to each of the other NIMs 152a-n on the local and remote Aggregation Switches 106a/b. The MAC/HDI tables in the Switching and/or Queuing ASICs in the NIMs 152a-n then flush the entry for the corresponding MAC address. The decision to whether delete the entry locally or not depends on the entry's ownership and type of port where the MAC entry was learned. Entries learned on fixed ports or ordinary aggregates (i.e. LAG) are flushed (and the corresponding event propagated) only if the flush request was received on the NIM 152 that owns the entry. Entries learned on MC-LAG aggregates are only flushed (and the flush event propagated) if there are no active/operational ports that are members of the aggregate neither in the local switch nor on the remote switch.

CMM 150a-b and NIMs 152a-n are aware of the entire list of MC-LAG member ports and their states (active/inactive) in the multi-chassis system. When the flush message includes a local port identifier (e.g., gport values) that is valid only on the local Aggregation Switch, the NIM 152 that owns that MAC address being deleted converts the local port identifier to a global port identifier (e.g. MID or modid and device port values) and then transmits the flush message over the IPC to the other NIMs 152a-n of the local and remote Aggregation Switches 106a/b. The flushing requests may be triggered by distinct events such a port interface status notifications (e.g. port down) or via explicit management request. For example, when CMM 150a receives a 'no mac-learning dynamic' management message or a static MAC address is deleted upon user request, and the flush allowance requirements describer earlier are met, then the CMM 150a transmits a flush message with the MAC address to NIMs 150a-n of Aggregation Switch 106a and to CMM 150b of the remote Aggregation Switch 106b.

Figure 9:
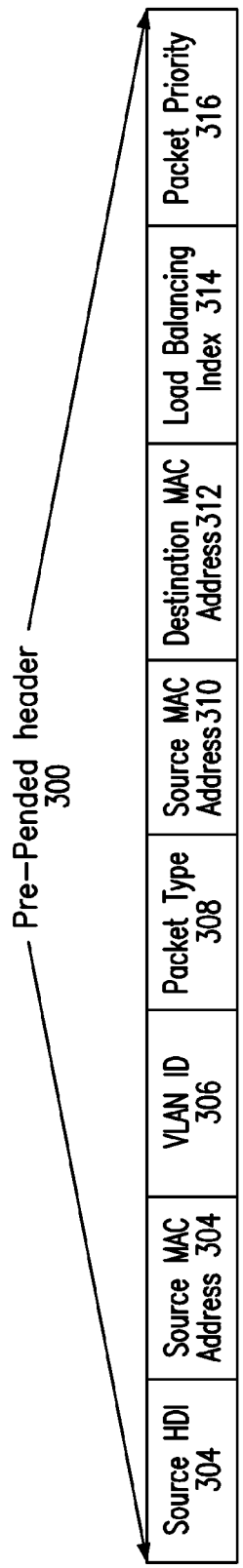
FIG. 9 illustrates a schematic block diagram of an embodiment of a pre-pended header of a packet in the multi-chassis system in accordance with the present invention.

FIG. 9 illustrates a schematic block diagram of an embodiment of a pre-pended header of a packet in the multi-chassis system. The pre-pended header 300 includes fields for source HDI 302, destination HDI 304, VLAN ID 306, packet type 308, source MAC address 310 and destination MAC address 312. In an embodiment, the pre-pended header may also include load balance identifier 314 and packet priority 316. The destination HDI 304 includes, for example, the port identifier and MID of a Switching ASIC (e.g. MID=24, port ID=5 or MID=54, device port=12), of either the local or peer Aggregation Switch, associated with the destination MAC address. In another embodiment, the destination hardware device information may include the global port value (GPV) of the external port interface associated the destination MAC address. The destination hardware device information may also include MID of the Switching ASIC connected to the VFL, NIMs, Queuing ASICs, etc. The source HDI 302 may include the MID of the Switching ASIC and the port identifier (e.g., device port) and/or global port value (GPV) of the external port interface. The load balance identifier 314 is used to help the Queueing ASIC to decide which VFL member port to be used as a transit/gateway port to reach the peer Aggregation Switch. The packet priority 316 is used by the Queueing ASIC to determine the specific priority queue.

Figure 10:
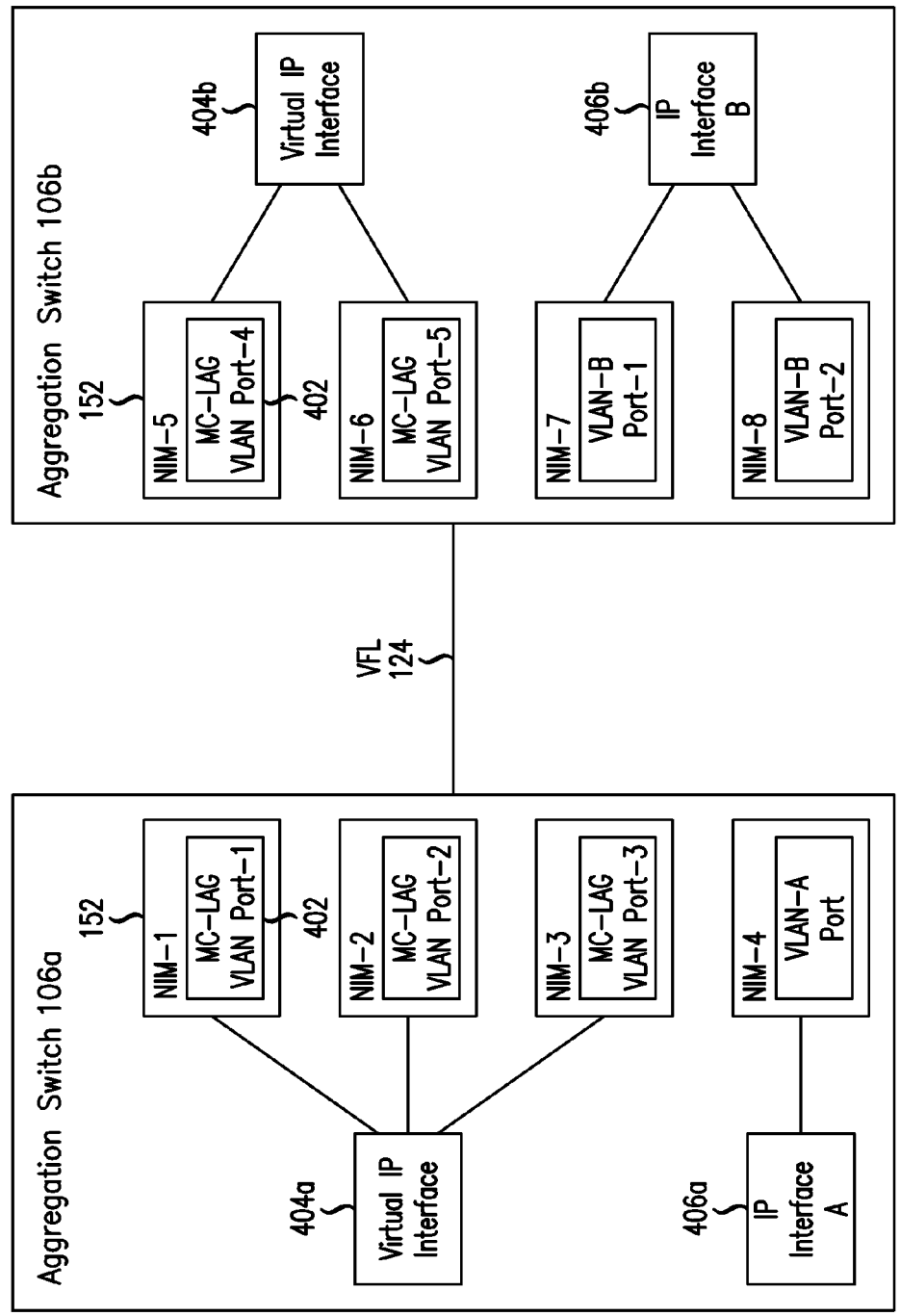
FIG. 10 illustrates a schematic block diagram of an embodiment for configuring IP interfaces to handle Layer 3 services on Aggregation Switches in a multi-chassis system in accordance with the present invention.

FIG. 10 illustrates a schematic block diagram of an embodiment for configuring IP interfaces to handle Layer 3 services on Aggregation Switches 106a and 106b in a multi-chassis system in accordance with the present invention. In general, an IP interface is configured for each VLAN coupled to the Aggregation Switches 106a and 106b. For example, IP Interface A 406a can be configured for VLAN-A coupled to VLAN-A port on NIM-4 via a direct link. Likewise, IP Interface B 406b can be configured for VLAN-B coupled to VLAN-B Ports-1 and 2 on NIM-7 and NIM-8 via a LAG.

However, a basic routing principle states that IP addresses must be unique throughout the network. Therefore, in order to support IP interfaces on VLAN's attached to MC-LAGs, the IP subnet running on such a MC-LAG VLAN can only be singly-attached to any outside Layer 3 routing infrastructure. In other words, there is a single Layer 3 exit point from the MC-LAG's IP subnet, and that Layer 3 exit point is formed of a virtual router which runs across the pair of MC-LAG Aggregation Switches 106a and 106b.

In an embodiment, the virtual router includes respective Virtual IP Interfaces 404a and 404b running on each of the Aggregation Switches 106a and 106b for a particular MC-LAG VLAN. For example, as shown in FIG. 10, Virtual IP Interfaces 404a and 404b are configured for the MC-LAG coupled to MC-LAG VLAN Port-1 on NIM-1, MC-LAG VLAN Port-2 on NIM-2, MC-LAG VLAN Port-3 on NIM-3, MC-LAG VLAN Port-4 on NIM-5 and MC-LAG VLAN Port-5 on NIM-6.

In an embodiment, each Virtual IP Interface 404a and 404b for the MC-LAG VLAN is defined with the same IP address. In a further embodiment, each Virtual IP Interface 404a and 404b is also defined with the same IP subnet. However, in other embodiments, the Virtual IP Interfaces 404a and 404b can be assigned different IP addresses and/or IP subnets, depending the type of MC-LAG VLAN. In addition, a reserved MAC address is automatically allocated (possibly from the VRRP MAC range) to be used as the router MAC. In an embodiment, the MAC address is allocated from the range of 255 MAC addresses reserved for Virtual Router Redundancy Protocol (VRRP) to set up the static ARP entries. Furthermore, Layer 3 routing protocols may not be configurable on the Virtual IP Interfaces 404a and 404b to prevent the routing processes on the Virtual IP interfaces 404a and 404b from sending or processing received Layer 3 routing control packets on the MC-LAG VLAN. However, the Layer 3 routing functionality should be enabled on Virtual IP interfaces 404a and 404b.

If the Virtual IP Interfaces 404a and 404b are assigned the same IP address, the Virtual IP Interfaces 404a and 404b are further configured to receive Address Resolution Protocol (ARP) packets with the single IP address on the MC-LAG VLAN. For example, a special flag can be set indicating duplicate ARPs for the Virtual IP Interface 404a/404b should not be alarmed. As such, ARPs with the IP address of the Virtual IP Interface 404a/404b received on the MC-LAG VLAN are not considered inappropriate.

Figure 11:
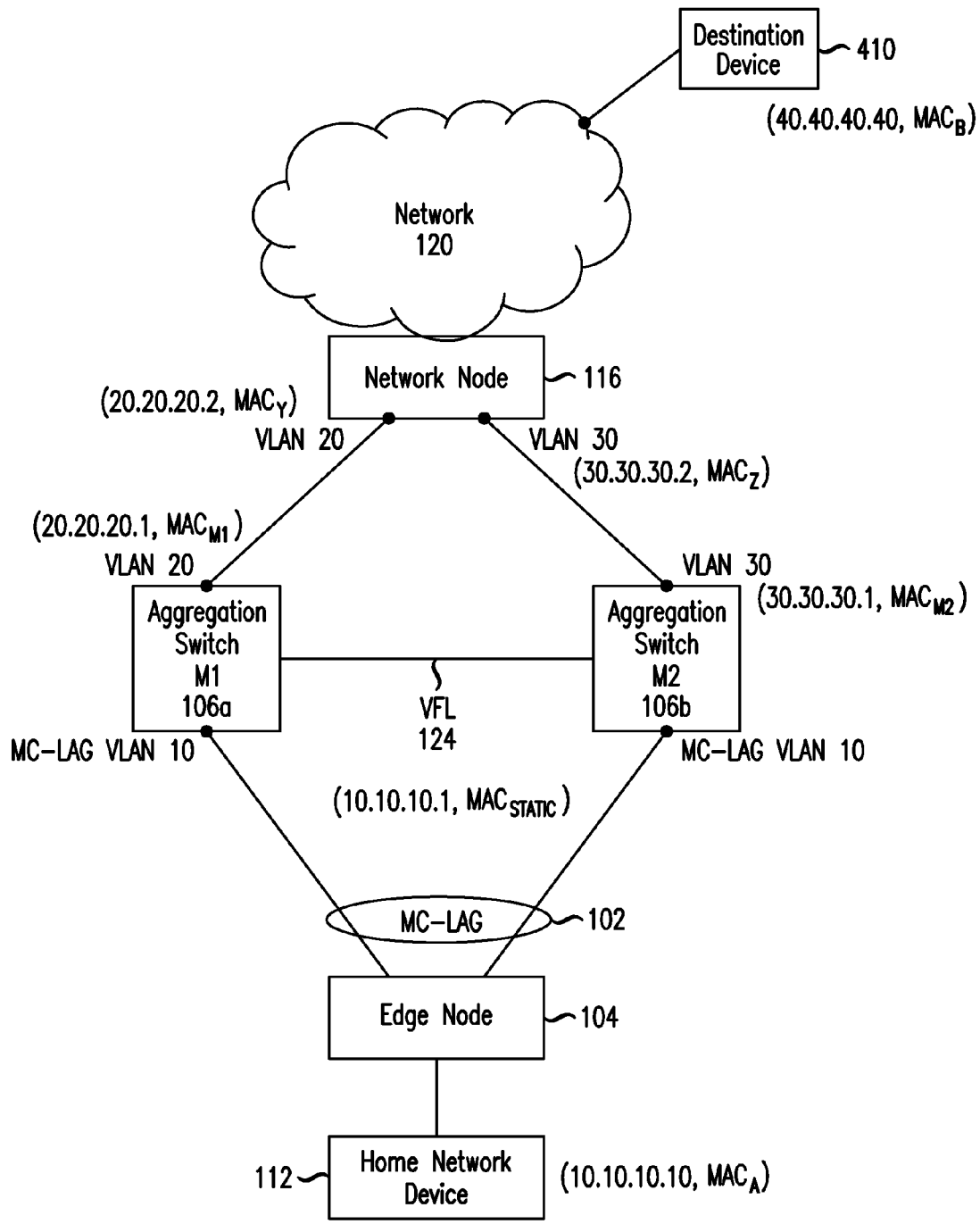
FIG. 11 illustrates a schematic block diagram of an embodiment for implementing Layer 3 routing using a virtual IP interface on the Aggregation Switches in accordance with the present invention.

The MC-LAG VLANs can only be configured on the multi-chassis aggregate logical ports or on the virtual fabric link (VFL) 124 logical link. An example configuration of the MC-LAG VLAN on the MC-LAG logical ports is shown in FIG. 11. As can be seen in FIG. 11, MC-LAG VLAN 10 is configured on MC-LAG 102 coupled between Aggregation Switches 106a/106 (hereinafter referred to as M1/M2) and Edge Node 104. The IP address of 10.10.10.1 has been assigned to the virtual IP interface associated with MC-LAG VLAN 10. In addition, a static MAC address ($MAC_{STATIC}$) has also been assigned to the virtual IP interface for MC-LAG VLAN 10.

In an exemplary operation, home network device 112 coupled to Edge Node 104 is also within VLAN 10 and has an IP address of 10.10.10.10 and a MAC address of $MAC_A$. Communications from home network device 112 and destined for a destination device 410 with an IP address of 40.40.40.40 and a MAC address of $MAC_B$ are routed through Edge Node 104 towards M1/M2 via MC-LAG 102. Each Aggregation Switch M1 and M2 has a respective upstream connection (via VLAN 20 and VLAN 30) with Network Node 116. Therefore, if the communications are received at M1, M1 routes the communications via VLAN 20 towards Network Node 116. For example, M1 routes communications destined for VLAN 40 to Network Node 116 on VLAN 20 at IP address 20.20.20.2 with a MAC address of $MAC_Y$. Likewise, if communications are received at M2, M2 routes the communications via VLAN 30 towards Network Node 116. For example, M2 routes communications destined for VLAN 40 to Network Node 116 on VLAN 30 at IP address 30.30.30.2 with a MAC address of $MAC_Z$. Network Node 116 routes communications received from either M1 or M2 that are destined for VLAN 40 through the core network 120 towards destination device 410.

In a similar exemplary operation, communications from device 410 and destined for home network device 112 are routed through core network 120 to Network Node 116. Network Node 116 has a separate direct link to each Aggregation Switch M1 and M2. Therefore, Network Node 116 can use Equal-Cost Multi-Path Routing (ECMP) to determine whether to route the communications to M1 or M2. If the communications are to be routed to M1, Network Node 116 routes the communications destined for VLAN 10 to M1 on VLAN 20 at IP address 20.20.20.1 with a MAC address of $MAC_{M1}$. Likewise, if communications are to be routed to M2, Network Node 116 routes the communications destined for VLAN 10 to M2 on VLAN 30 at IP address 30.30.30.1 with a MAC address of $MAC_{M2}$. M1 and M2 can each directly route communications destined for home network device 112 on VLAN 10 to Edge Node 104 via MC-LAG 102.

Figure 12:
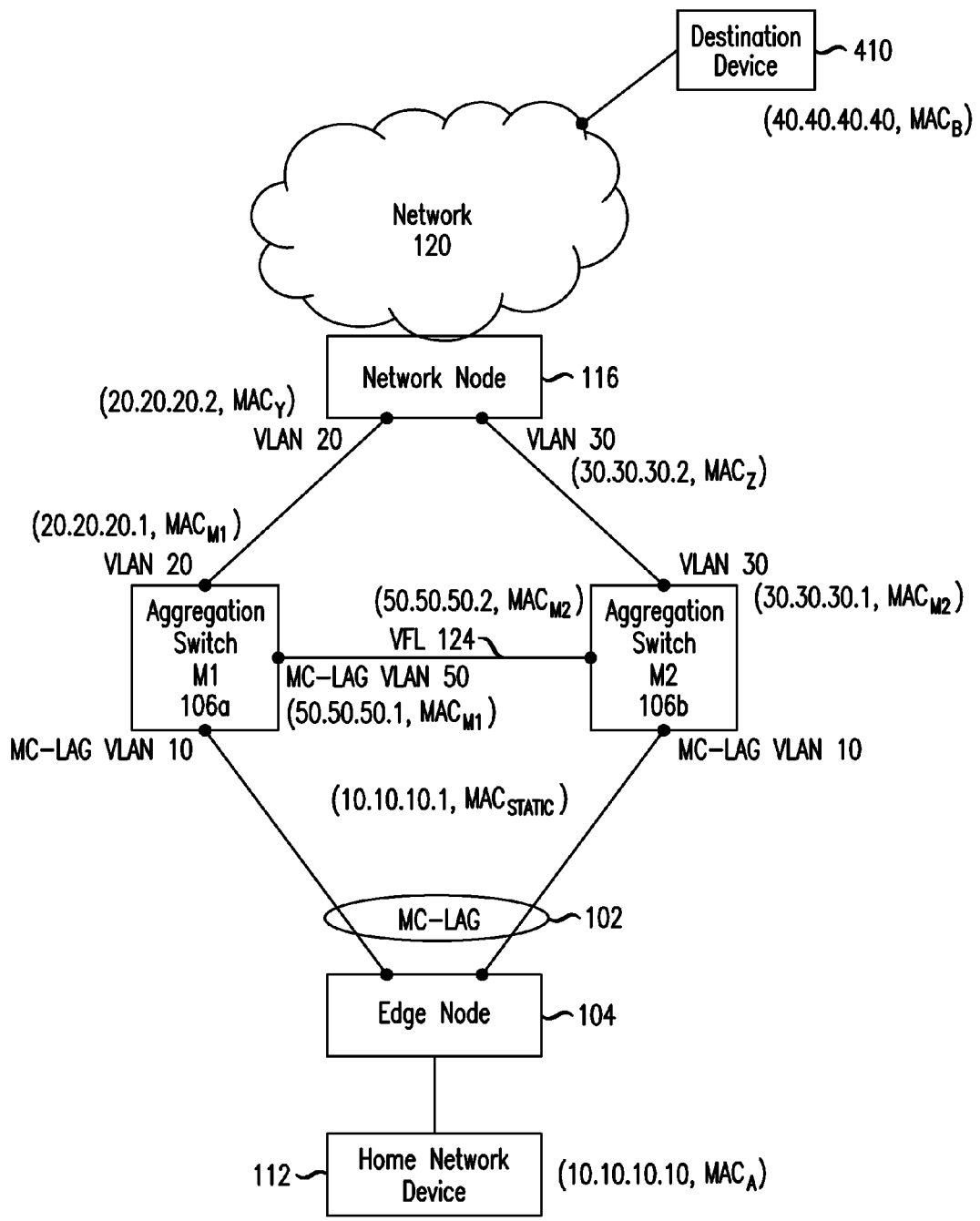
FIG. 12 illustrates a schematic block diagram of an embodiment for implementing Layer 3 routing between the Aggregation Switches in accordance with the present invention.

An example configuration of the MC-LAG VLAN on the VFL 124 is shown in FIG. 12. As can be seen in FIG. 12, the ports coupled to the VFL 124 are assigned to MC-LAG VLAN 50. Thus, the virtual IP interfaces on each Aggregation Switch M1 and M2 are each assigned IP address in the subnet 50.50.50.0/24. However, since MC-LAG VLAN 50 is only between Aggregation Switches M1 and M2, each virtual IP interface is assigned a different IP address/subnet and MAC address. For example, the virtual IP interface on M1 for MC-LAG VLAN 50 is assigned IP address 50.50.50.1 and MAC address $MAC_{M1}$, while the virtual IP interface on M2 for MC-LAG VLAN 50 is assigned IP address 50.50.50.2 and MAC address $MAC_{M2}$.

The virtual IP interfaces configured on the VFL logical port is used to provide for an alternate (non-ECMP) path for traffic coming from the Edge Node 104 and destined for the upstream network via the VFL. As such, $M_1$ and $M_2$ can establish routing adjacencies with each other via the virtual IP interface for MC-LAG VLAN 50. Although the primary path for the upstream L3 networks will be directly across the upstream VLAN (e.g., VLAN 20 for M1 or VLAN 30 for M2), backup routes can be established across the VFL 124 using the configured virtual IP interface MC-LAG VLAN 50.

Figure 13:
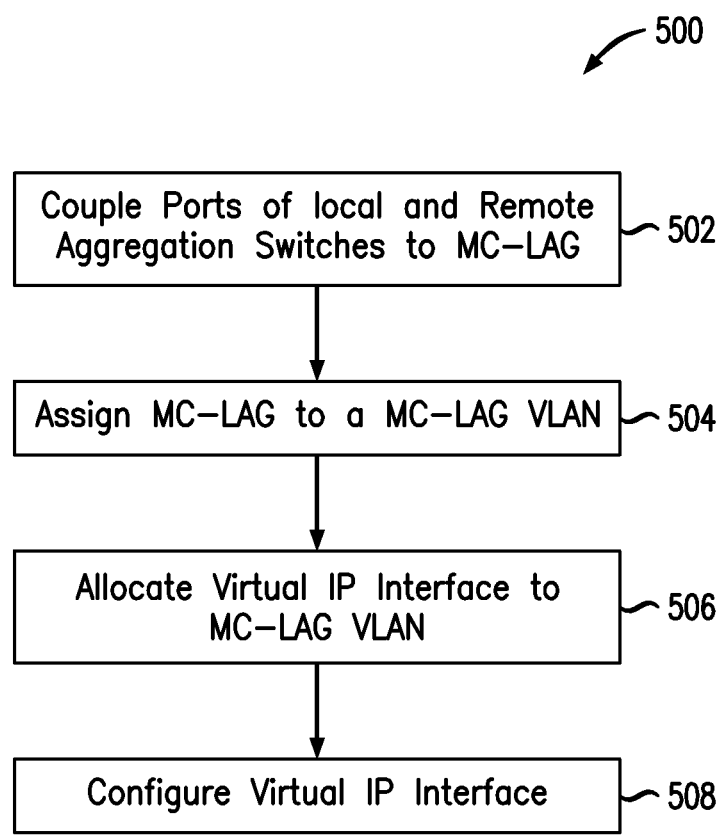
FIG. 13 illustrates an exemplary process for configuring a virtual IP interface on Aggregation Switches in a multi-chassis system in accordance with the present invention.

FIG. 13 illustrates an exemplary process 500 for configuring a virtual IP interface on Aggregation Switches in a multi-chassis system in accordance with the present invention. The process begins at 502, where a portion of local customer-facing ports of a local Aggregation Switch of the multi-chassis system and a portion of customer-facing ports of a remote Aggregation Switch of the multi-chassis system are coupled to a multi-chassis link aggregation group (MC-LAG). At step 504, the MC-LAG is assigned to a multi-chassis link aggregate group virtual local area network (MC-LAG VLAN), and at 506, a virtual Internet Protocol (IP) interface on each Aggregation Switch is allocated to the MC-LAG VLAN. Thereafter, at 508, the virtual IP interfaces are configured on the Aggregation Switches with an IP address.

The network interface modules 152 and chassis management modules 150 each include one or more processing devices, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The NIMs 152 and CMMs 150 also include a memory that is an internal memory or an external memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. In addition, the NIMs 152 and CMMs 150 may implement one or more of their functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Furthermore, the NIMs 152 and CMMs 150 may execute hard-coded and/or software and/or operational instructions stored by the internal memory and/or external memory to perform the steps and/or functions described herein and may be implemented in a single or in one or more integrated circuits.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may also be used herein, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A local aggregation switch in a multi-chassis system, comprising:
   a plurality of network interface modules, each including at least one respective customer-facing port, a portion of the customer-facing ports being member ports of a multi-chassis link aggregate group (MC-LAG) and assigned to a multi-chassis link aggregate group virtual local area network (MC-LAG VLAN), the member ports of the MC-LAG including remote ports on a remote aggregation switch of the multi-chassis system, the remote aggregation switch being active and in a separate physical chassis; and
   a virtual Internet Protocol (IP) interface allocated to the MC-LAG VLAN and configured on both the local aggregation switch and the remote aggregation switch, the virtual IP interface having an IP address.

2. The local aggregation switch of claim 1, wherein a Media Access Control (MAC) address is allocated as a router MAC for the virtual IP interface.

3. The local aggregation switch of claim 1, wherein the MAC address is a Virtual Router Redundancy Protocol (VRRP) address.

4. The local aggregation switch of claim 1, wherein the virtual IP interface includes a single subnet for both the local aggregation switch and the remote aggregation switch.

5. The local aggregation switch of claim 1, wherein Layer 3 routing protocols are not configurable on the virtual IP interface.

6. The local aggregation switch of claim 1, wherein the virtual IP interface is configured to receive Address Resolution Protocol (ARP) packets with the single IP address on the MC-LAG VLAN.

7. The local aggregation switch of claim 1, wherein the member ports of the MC-LAG are coupled to an edge node.

8. The local aggregation switch of claim 1, wherein the member ports of the MC-LAG are coupled to a virtual fabric link coupled between the local aggregation switch and the remote aggregation switch.

9. The local aggregation switch of claim 8, wherein the virtual IP interface provides an alternate path for traffic originating from an edge node coupled to the local aggregation switch and destined for a network node coupled to the local aggregation switch, and wherein the alternate path is not an Equal-Cost Multi-Path Routing (ECMP) path.

10. The local aggregation switch of claim 8, wherein a different respective virtual IP interface with a different IP address and subnet is allocated on each of the local aggregation switch and the remote aggregation switch.

11. The local aggregation switch of claim 10, wherein the different virtual IP interfaces on the local aggregation switch and the remote aggregation switch each have a different respective Media Access Control (MAC) allocated thereto.

12. A method for configuring a virtual Internet Protocol (IP) interface on a local aggregation switch of a multi-chassis system, comprising:
   coupling a portion of local customer-facing ports of the local aggregation switch to a multi-chassis link aggregation group (MC-LAG), the MC-LAG being further coupled to a portion of remote customer-facing ports of a remote aggregation switch of the multi-chassis system, the local aggregation switch and the remote aggregation switch each being active and in a separate respective physical chassis;
   assigning the MC-LAG to a multi-chassis link aggregate group virtual local area network (MC-LAG VLAN);
   allocating a virtual Internet Protocol (IP) interface to the MC-LAG VLAN; and
   configuring the virtual IP interface on the local aggregation switch with an IP address.

13. The method of claim 12, further comprising:
   allocating a Media Access Control (MAC) address as a router MAC for the virtual IP interface.

14. The method of claim 13, wherein the MAC address is a Virtual Router Redundancy Protocol (VRRP) address.

15. The method of claim 12, wherein the virtual IP interface includes a single subnet for both the local aggregation switch and the remote aggregation switch.

16. The method of claim 12, further comprising:
   preventing Layer 3 routing protocols from being configured on the virtual IP interface.

17. The method of claim 12, wherein the MC-LAG is coupled to an edge node.

18. The method of claim 12, wherein the MC-LAG is a virtual fabric link coupled between the local aggregation switch and the remote aggregation switch.

19. The method of claim 18, further comprising:
   providing an alternate path for traffic originating from an edge node coupled to the local aggregation switch and destined for a network node coupled to the local aggregation switch via the virtual IP interface, and wherein the alternate path is not an Equal-Cost Multi-Path Routing (ECMP) path.

20. The method of claim 18, further comprising:
   allocating a different respective IP interface with a different respective IP address and subnet on each of the local aggregation switch and the remote aggregate switch; and
   allocating a different respective Media Access Control (MAC) address to each of the different IP interfaces.

* * * * *